US007882058B1

(12) United States Patent
Ghaed

(10) Patent No.: US 7,882,058 B1
(45) Date of Patent: Feb. 1, 2011

(54) METHOD AND APPARATUS FOR BUSINESS RESOURCE AUTOMATION

(75) Inventor: Ali Ghaed, Bethesda, MD (US)

(73) Assignee: XFI Corporation, Bethesda, MD (US)

( * ) Notice: Subject to any disclaimer, the term of this patent is extended or adjusted under 35 U.S.C. 154(b) by 289 days.

(21) Appl. No.: 11/738,312

(22) Filed: Apr. 20, 2007

Related U.S. Application Data

(60) Provisional application No. 60/793,963, filed on Apr. 20, 2006.

(51) Int. Cl.
*G06F 7/00* (2006.01)
*G06F 17/00* (2006.01)

(52) U.S. Cl. .................................... 707/608; 707/956

(58) Field of Classification Search .................. None
See application file for complete search history.

(56) References Cited

U.S. PATENT DOCUMENTS

| | | | | | |
|---|---|---|---|---|---|
| 5,181,162 | A | * | 1/1993 | Smith et al. ................. | 715/209 |
| 5,216,592 | A | * | 6/1993 | Mann et al. .................... | 705/8 |
| 6,088,679 | A | * | 7/2000 | Barkley ........................ | 705/8 |
| 6,892,192 | B1 | * | 5/2005 | Geddes et al. ................ | 706/14 |
| 7,162,427 | B1 | * | 1/2007 | Myrick et al. ................. | 705/1 |
| 2001/0034739 | A1 | * | 10/2001 | Anecki et al. ............... | 707/500 |
| 2002/0035593 | A1 | * | 3/2002 | Salim et al. ................. | 709/202 |
| 2003/0216951 | A1 | * | 11/2003 | Ginis et al. .................... | 705/8 |
| 2004/0122831 | A1 | * | 6/2004 | Ha et al. ..................... | 707/100 |
| 2004/0181471 | A1 | * | 9/2004 | Rogers ........................ | 705/31 |
| 2004/0205472 | A1 | * | 10/2004 | Purvis ........................ | 715/500 |
| 2004/0243459 | A1 | * | 12/2004 | Geritz et al. ................. | 705/10 |
| 2005/0091093 | A1 | * | 4/2005 | Bhaskaran et al. ............. | 705/7 |
| 2005/0096937 | A1 | * | 5/2005 | Subash et al. ................. | 705/1 |
| 2006/0129443 | A1 | * | 6/2006 | Chen et al. ...................... | 705/8 |
| 2006/0212475 | A1 | * | 9/2006 | Cheng ...................... | 707/104.1 |
| 2006/0259499 | A1 | * | 11/2006 | Moulckers et al. .......... | 707/100 |

OTHER PUBLICATIONS

Dynamic routing and operational controls in workflow management system, Akhil et al., Instute for operations research and the management sciences, 1999.*
Business process reengineering and workflow automation: a technology transfer experience, Aversano et al, The Journal of system and software, vol. 63 pp. 29-44, 2002.*
Information supply for business processes: coupling workflow with document analysis and information retrieval, Abecker et al, Knowledge-based systems, vol. 13 pp. 271-284, 2000.*
A knowledge-based approach for business process reengineering, Ricardo et al., , Knowledge-based systems, vol. 15 pp. 473-483, 2002.*

* cited by examiner

*Primary Examiner*—Pierre M Vital
*Assistant Examiner*—Augustine Obisesan
(74) *Attorney, Agent, or Firm*—Schiff Hardin LLP

(57) ABSTRACT

A method and system of computer-assisted business resource automation that is applicable to a variety of business enterprise requirements including, but not limited to customer relationship management and sales force automation. The system provides improved an apparatus and method for automating the production of business resources such as documents and presentations. The system further provides an apparatus and method for analyzing the associated processes of the enterprise and providing business intelligence such as sales analytics. In particular, aspects of the invention include, but are not limited to: a hierarchical architecture that simplifies customization and maintenance of enterprise software, the encapsulation of data within reusable intelligent advisor objects, and the flexible integration of a variety of expert systems functionality and other apparatus and means of artificial intelligence therein.

10 Claims, 41 Drawing Sheets

Exemplary HAWK Enterprise Application Hierarchies

| Solution | Subsciber | Channel | Silo | Territory | Echelon |
|---|---|---|---|---|---|
| SalesHawk | Alpha Corp. | Wholesale | B2B | Global | Chief Executive |
| | | | | | Chief Operations |
| | | | | USA | VP Sales |
| | | | | | VP Finance |
| | | | | Northeast | Sales Manager |
| | | | | | Sales Rep |
| | | | | | Sales Affiliate |
| | | | | Northwest | Sales Manager |
| | | | | | Sales Rep |
| | | | | | Sales Affiliate |
| | | | | ... | ... |
| | | | | Canada | ... |
| | | | | ... | ... |
| | | | | Germany | ... |
| | | Retail | B2B | Northeast | Sales Rep |
| | | | | | Sales Affiliate |
| | | | | | Sales Manager |
| | | | B2C | Northeast | Sales Rep |
| | | | | | Sales Manager |
| | Beta Corp. | Retail | B2B | ... | ... |
| | | | B2C | ... | ... |
| | Gamma Corp. | Retail | B2C | ... | ... |
| MarketingHawk | Alpha Corp. | | | | |
| | ... | | | | |
| SupportHawk | | | | | |
| AdminHawk | | | | | |
| ... | | | | | |

FIG 1

Exemplary Echelon View Matrix

Centers

| | Client | Prospect | Marketing | Analysis | Reference | Wholesale Support | Retail Support | Sales Messages | Analysis | Report | Financial | Incentive | Revision | Billing and Receivables |
|---|---|---|---|---|---|---|---|---|---|---|---|---|---|---|
| B2B-Sales Representative | X | X | X | X | X | X | | X | | | | | | |
| B2B-Sales Regional Manager | | | | X | X | X | | X | | X | | | | |
| B2C-Sales Affiliate | X | | X | | | | X | X | | | | | | |
| Financial Analyst | | | | | X | X | | | | X | X | | | |
| Financial Operations | | | | | | | | | | | | X | X | X |
| Executive | | | | | | | | | X | X | | | | |

FIG 4

TABLE OF ADVISORS

| Advisors | Functionality |
|---|---|
| Client Profile Advisor | <ul><li>Capture subjective information about a customer (needs, motivations, personality, etc.)</li><li>Reconcile internal, public domain, and $3^{rd}$ party info on a customer</li><li>Draw inference from all the information gathered on the customer to build a coherent profile model</li></ul> |
| Meeting Advisor | <ul><li>Suggests and drafts an effective meeting structure including an agenda</li><li>Suggests the set of presentation, leave-behinds, and materials to be sent in advance</li></ul> |
| Solution Advisor | <ul><li>Maps the client profile into product needs</li><li>Merges the stated client needs with the deduced ones, and make sure the composite is coherent</li><li>Suggests products and intelligently configure them</li><li>Suggests and configures competitive products</li><li>Creates product comparisons across all the offerings (from self and competitors)</li></ul> |
| Financial Advisor | <ul><li>Assesses the clients profile to justify a proper pricing strategy</li><li>Manages the workflow required for the analysis and approval of the quote by the proper departments</li></ul> |
| Contract Advisor | <ul><li>Dynamically creates a complete, valid and coherent contract using all the information provided by other advisors</li><li>Includes special clauses needed depending on the customer's profile</li><li>Allows dynamic changes to the wording and addition or removal of the contract</li><li>Manages the workflow required for review and approval of the agreement by the legal department</li></ul> |

FIG 5-1

| Advisors | Functionality |
|---|---|
| Presentation Advisor | - Uses information from all other advisors (Profile, Solution, Financial, etc.) to suggests a presentation content<br>- Once the content is selected, it helps in building a coherent and effective presentation using existing or synthesized templates<br>- Makes sure that the presentation's style, format, and flow are best match for the audience<br>- Suggests and provides supporting slides for some of the content covered in the presentation |
| Collateral Advisor | - Suggests the best collateral for the occasion<br>- Uses information from all other advisors (Profile, Solution, Financial, etc.) to suggests a collateral content<br>- Once the content is selected, it helps in building a coherent and effective collateral using existing or synthesized templates<br>- Makes sure that the collateral style, format, and flow are best match for the audience and the medium |
| Analytics Advisor | - Figures out the proper information to be retained from other advisors interactions for warehousing<br>- Manages the abstract set of reports<br>- Suggests and creates reports for different situations |
| Deal Advisor | - Figures out all the bonuses and extra rewards available to the customer<br>- Suggests and justifies the best price available to a customer<br>- Creates a complete and valid quote |
| Communication Advisor | - Determines and suggests the best communication form to be used (email, letter, call, etc.)<br>- Assembles the best content to be included in the communication<br>- Suggests or creates the best template for the communication<br>- Creates the final communication dynamically<br>- Adds small touches to the communication for the most effectiveness |

FIG 5-2

| Advisors | Functionality |
|---|---|
| Implementation Advisor | <ul><li>Determines all the key steps and milestones</li><li>Identifies key issues and risks</li><li>Creates a plan</li><li>Manages the workflow for execution</li><li>Provides alarms and notices on the key points</li></ul> |
| Objection Advisor | <ul><li>Manages a knowledge base of common objections and how to deal with them</li><li>Maps the stated objection to the best objection class</li><li>Creates the proper response to the objection</li><li>The final outcome is fed to other advisors (e.g. Communication and Collateral) for proper responses to be created.</li></ul> |
| Conquest Advisor | <ul><li>Analyses the strong and weak points of the current incumbent</li><li>Feeds other advisors (like Financial and Objection) to provide effective strategies</li></ul> |
| Closing Advisor | <ul><li>Assesses the barriers to close at any point in the cycle</li><li>Determines the closing odds</li><li>Suggests the best time and strategy to move</li></ul> |
| Campaign Management Advisor | <ul><li>Suggests campaigns for different situations</li><li>It customizes a given campaign using the knowledgebase and outcomes of previous campaigns</li><li>Evaluates, ranks, and categorized prospects for inclusion in different campaigns</li><li>Suggests personalization and variations in interaction with different members of the same campaign</li><li>Evaluates the outcome of campaigns and determines success and follow ups</li></ul> |
| Prospect Advisor | <ul><li>Evaluates and scores prospects and leads</li><li>Determines the best strategy to approach a prospect</li><li>Feeds other advisors to create the best materials</li></ul> |

FIG 5-3

| Advisors | Functionality |
|---|---|
| Opportunity Advisor | - Analyses an opportunity within the context of a client and similar opportunities<br>- Determines a coherent plan for managing that opportunity |
| Strategy Advisor | - Manages a knowledge base of common strategies<br>- Maps a given situation to the best class<br>- Instantiates the proper strategy details for the given situation<br>- The final outcome is fed to other advisors<br>- This advisor is used by other advisors to perform many of their tasks |
| Negotiation Advisor | - Determines a proper negotiation strategy<br>- Tracks the negotiation<br>- Creates "give" and "take" balance sheet<br>- Evaluates every give and take for the cost to all parties |
| Guardian Advisor | - Assesses the flight risk of a customer<br>- Suggests proper steps to minimize the flight risk<br>- Feeds other advisors for actions |
| Growth Advisor | - Determines proper cross selling, up-selling and expansion of a relationship<br>- Feeds other advisors for actions |
| Call Center Advisor | - Helps optimize the interactions in a call session<br>- For incoming calls, it seeks opportunities to create opportunities<br>- For outgoing calls creates efficient strategies for managing a call<br>- During a call it helps manage issues brought up that require more in depth knowledge |
| Proposal and Quote Advisor | - Maintains a knowledge base of response rules<br>- Suggests the proper content for a proposal<br>- Assembles all the information from other advisors to create a coherent and complete proposal |

FIG 5-4

| Advisors | Functionality |
|---|---|
| Financial Analysis Advisor | <ul><li>Decide what type of analysis are best suited to the customer's situation</li><li>If a compctitive analysis is decided, select the best competitors to include in the analysis</li><li>Perform the analysis from multiple points of view and select the best fitting (creates the best results)</li><li>Decide on the best form to state the results</li><li>Create summary of the analysis for other Advisors' benefit and use</li></ul> |
| Case Study Advisor | <ul><li>Manages a database of cases</li><li>Matches a gives customer and situation to the best case</li><li>Creates the content and form of the case study</li></ul> |

METHOD AND APPARATUS FOR BUSINESS RESOURCE AUTOMATION

CROSS-REFERENCE TO RELATED APPLICATION

This application claims the benefit of U.S. Provisional Patent Application Ser. No. 60/793,963, filed Apr. 20, 2006, which is incorporated by reference herein.

BACKGROUND OF THE INVENTION

1. Field of the Invention

The present invention relates generally to business resource automation, more particularly to the use of artificial intelligence to facilitate the resource automation.

2. Description of the Related Art

A modern commercial enterprise coordinates the activities of thousands to millions of entities: executives in sales, finance, and marketing; sales, marketing, finance and support staff; and their counterparts in customer organizations. The technological advances of the last three decades have dramatically increased the ability of businesses of every size to inexpensively produce polished, professional communications in a variety of media: word-processed documents, electronic presentations, spreadsheets, email, websites, images, and audio and visual media.

In addition to tangible information resources of this kind, the advent of communication technologies such as the fax machine, the Internet, the cell phone, and video conferencing enable the processes and actions of widely separated personnel and business entities to be coordinated in ways and to a degree that was never before possible.

These capabilities increase productivity, but also raise the expectation of professionalism. To compete in this environment even small companies must use and maintain a suite of information assets that did not exist 20 or 30 years ago when the electric typewriter and photocopier represented the state of the art. There is virtually no populated place on the planet where a business can be excused for being out of touch at any time of the day or night—neither with its customers nor its own internal personnel and departments.

To satisfy this expectation a new class of software has emerged called "enterprise software". Enterprise software has been described as: "software that solves an enterprise problem (rather than a departmental problem)." Due to the cost of building what is often proprietary software, only large organizations attempt to build software that models the entire business enterprise and is the core system of governing the enterprise and the core of business communications within the enterprise.

As many business enterprises have similar departments and systems, enterprise software is often available as a suite of programs that have attached development tools to modify the common programs for the specific enterprise. Mostly these development tools are complex programming tools that require specialist capabilities. Thus, one often sees in job advertisements that a programmer is required to have specific knowledge of particular set of tools, such as "must be an SAP developer," etc.

See, the Internet site (http colon slash slash en dot wikipedia dot org slash wiki slash Enterprise_software) for further information.

Enterprise software is typically a suite of custom applications built upon a foundation of powerful Relational Database Management Systems (RDBMS) by a few major RDBMS vendors. The customization is provided by the RDBMS vendors themselves, or by third parties who often specialize in building atop one of the RDBMS systems. These suites typically are designed for a specific customer, and are run and maintained in-house by that customer's staff or contractors. This requires a substantial investment by the customer in licensing fees, network and hardware infrastructure, and IT personnel. It is economical only for large corporate enterprises.

One enterprise problem that affects many organizations is that of maintaining the goodwill of its customers by simply keeping in touch with them and following through on any problems that may have arisen. This challenge is so common that it has led to the creation of a subtype of enterprise software called Customer Relationship Management (CRM) software. A simple analog CRM system might be nothing more than a Rolodex-type data storage system and a tickler file. Modern enterprise CRM software systems are user interfaces to complex customized relational databases that help organizations keep track not only of changing street addresses, email addresses, and phone numbers, but also analyze purchasing history and track delivery and support issues.

The current state of enterprise software, CRM software, for example, has a number of shortcomings—economic, technical and human:

1) The cost of creating a customized CRM system and supporting it in-house is substantial, making it feasible only for large companies.

Recently, a new model of delivery for enterprise software has been tested. In this "hosted" method, the suite of customized applications is maintained and served by the vendor. The customer accesses the software via a web browser and pays subscription fees. The vendor thus bears the cost of infrastructure and maintenance. However, the cost of customization can still be substantial.

2) Even hosted solutions are still fundamentally a series of static forms that present information from relational tables via an RDBMS.

3) The value of CRM systems depends upon the completeness and coherency of the data its end users input through these forms. Fundamentally, this task is the same as filling in paper and pencil forms, and does nothing to alleviate a tension that exists between staff, who do the input, and executives, who hope to use the database for analysis. To staff, even the best designed CRM system represents just another task to accomplish. The system does little to increase the time an employee spends on high value, creative or engaging work. This means that staff sometimes accept the CRM reluctantly. In turn, this means the quality of the data upon which executives want to rely is doubtful.

4) The relational database model upon which current enterprise software is built is powerful and ideal for modeling many kinds of information. However, modeling some kinds of information, such as hierarchical information, is more difficult in a relational database architecture than in other formats, such as Extensible Markup Language (XML). And when a business process embodied in the table structure changes, as they must do continually, implementing the new change in a relational structure while preserving the semantics and integrity of the existing database can be costly and error prone. This either slows the adoption of valuable improved business processes, or obsoletes a costly existing CRM system.

Even if a business's processes are static, the content of its communications changes. Companies move their addresses, change their corporate image, embark on new sales campaigns and so on. These changes mean that template documents and images which are populated with data from the CRM system become out of date. This requires considerable time to go throughout the organization and update all templates and other business resources, or worse, leads to embarrassing errors in front of customers.

6) Fundamentally, existing CRM and other enterprise software systems only use modern technology to do ancient tasks: write documents and draw pictures. There are capabilities of modern computer science, such as such as expert systems and fuzzy logic that have not been applied at all in this field, and which are capable of creating and automating new classes of business resources such as marketing strategies as well as improving the quality of the familiar tangible resources such as documents and diagrams.

SUMMARY OF THE INVENTION

Accordingly, several objects and advantages of the present invention are:

1) to provide more economical means to address the problem of business resource automation through an improved hosting method of delivery;

2) to provide a non-tabular mode of business resource information handling based upon dynamic software entities (Agents) acting upon encapsulated information stored in a variety of formats; and 3) to use a plurality of means of artificial intelligence ("knowledge") to model evolving business processes and act upon enterprise information.

BRIEF DESCRIPTION OF THE DRAWINGS

FIG. 1 is a tabular representation of the hierarchical structure of a HAWK application.

FIG. 4 is a table showing the intersections and differences between a variety of echelons.

FIG. 5 is a table of advisors and descriptions of their functionality.

FIGS. 6a-6e is a series of screen captures showing the action of the analysis advisor in creating a flight report in the context of the executive echelon.

FIG. 7 is a screen capture showing the graphical representation of a director advisor.

FIG. 9 is a screen capture showing the graphical representation of a client profile advisor.

DETAILED DESCRIPTION OF THE PREFERRED EMBODIMENTS

Figure 2:
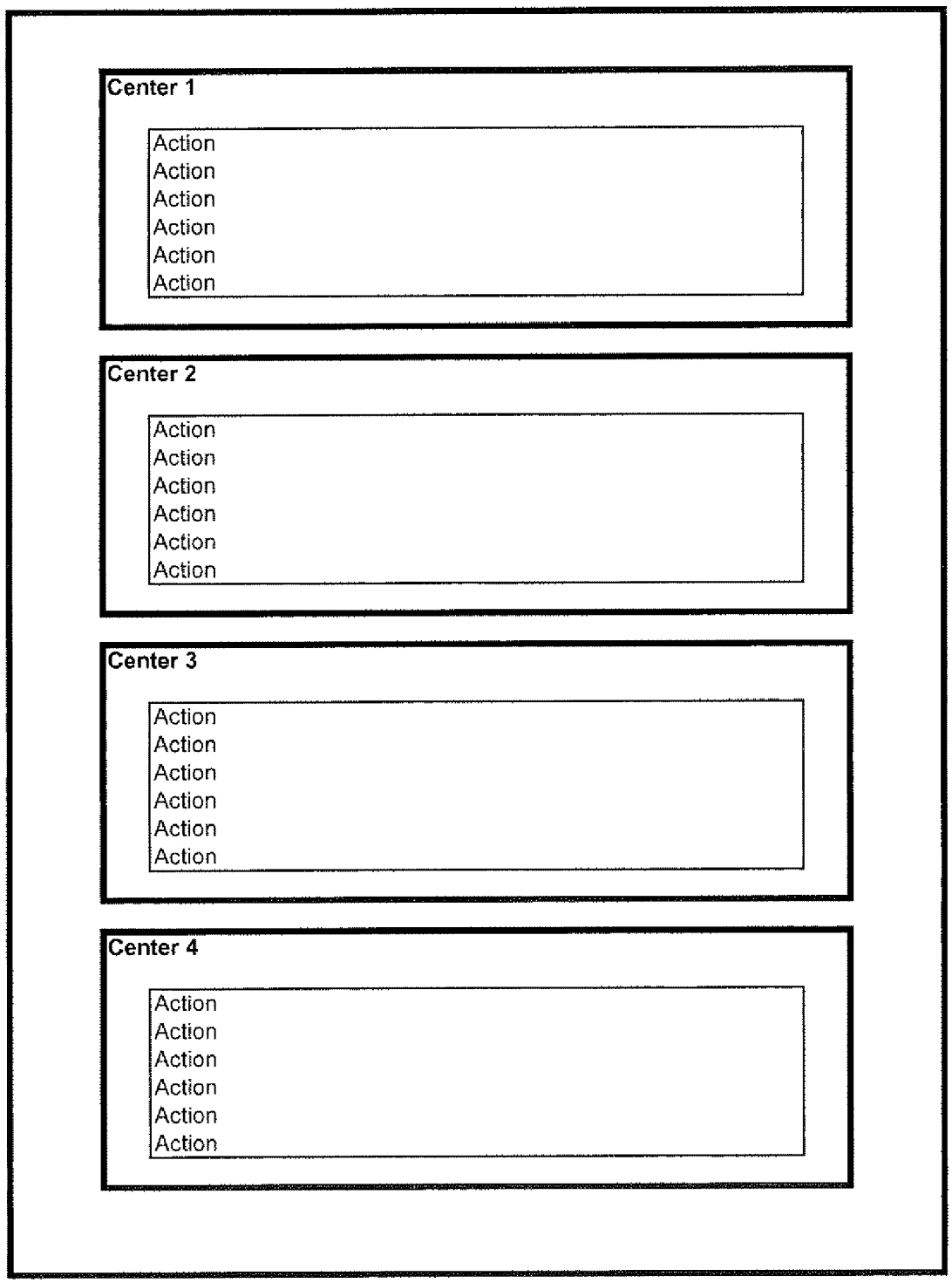
FIG. 2 is a block diagram showing the relationship of the elements of an echelon.

In a presently preferred embodiment, this hierarchical advisor with knowledge (or HAWK) paradigm is used to automate the processes involved in corporate sales efforts, for example, those of a multinational personal computer manufacturer with both retail and wholesale sales channels selling to both business and consumer customers. However, the HAWK sales implementation (SalesHawk) is only one of many potential implementations to intelligently automate any number of business resource automation processes. In addition to sales resource automation (SRA), the HAWK paradigm is adapted to marketing, service, support, financial, analytic and administrative requirements.

Hosting Architectures

In the presently preferred embodiment, SalesHawk is hosted as a distributed web application over the Internet. The customer/subscriber would gain access to SalesHawk via any common web browser by accessing a single public URL (or "Launch Page") via the HTTP or HTTPS protocols. The URL is served by an http/s server, and pages are created by one or more of a plurality of publicly inaccessible networked computers each providing one or more of session persistence database service, file storage, data analysis, dynamic HTML generation or any other service useful for supporting the subscriber URL. The vendor/host maintains user generated files, data, content and configuration information internally. This allows the level of service provided to subscriber(s) to be enhanced transparently by the addition of additional processing resources by the vendor.

Theoretically, the present invention could be run on a single un-networked computer running both the subscriber web browser and all the host services on the same physical computer in a number of processes. With all vendor proprietary programs and data delivered and regularly updated via a secured transportable computer readable medium, such as a removable drive, the hosting feature of the invention could be implemented virtually. This method of hosting might appeal to small business organizations or those in geographical situations where network connectivity is unreliable. All other features of the invention would be identical with the preferred embodiment described.

Hierarchical Architecture

The present invention derives flexibility to balance performance and economy from a hierarchical architecture. See FIG. 1. The defined levels of this hierarchy follow:

Solution—a solution is a HAWK application designed to be customizable for a particular commercial activity, often corresponding to common corporate departments such as sales, customer support, marketing or finance.

Subscriber—a subscriber is the economic business entity which pays for a customized version of a solution for defined subset(s) of its employees, partners, affiliates or customers, each with defined access privileges in the HAWK application. For example, a subscriber might be a multi-national corporation consisting of a set of subsidiary corporations existing as separate legal entities in several countries.

A single subscriber may subscribe to a plurality of HAWK solutions, such as SalesHawk-Alpha Corp, and MarketingHawk-Alpha Corp.

A plurality of subscribers may subscribe to customized versions of the same solution, such as SalesHawk-Alpha Corp and SalesHawk-Beta Corp. The two solution-subscriber combinations might exist side-by-side on the same physical software and hardware platforms operated by the host, differentiated only by their access URL and a single customization and localization document and associated resources. Or they may be hosted on physically separate software and hardware infrastructure, distributed across a plurality of remote geographical locations and joined together at the point of the access URL by the host. This provides flexibility in meeting the subscriber's performance and security requirements and allows efficient and economical scaling of infrastructure by the host.

Channel—a subdivision of a subscriber's sales efforts, such as wholesale and retail sales. Channel definitions are determined arbitrarily by each subscriber according to its business processes or organizational structure and are not necessarily comparable across subscribers. For example retail and wholesale sales might represent channels for a particular subscriber.

Silo—one or more subdivisions of a channel. Like channels, silo definitions are determined arbitrarily by each subscriber according to its business processes or organizational structure and are not necessarily comparable across subscribers. For example, retail sales to business and consumers might represent silos in a retail sales channel, as opposed to a wholesale channel.

Territory—one or more subdivisions of a silo corresponding to the commercial activity taking place in a geographical region such as SalesHawk-Alpha Corp-Canada-Retail Sales-Business Sales Division-South West Region.

Echelon—a set of privileges to invoke a subset of the advisors defined for a solution together with a set of completed actions taken by those advisors. The user interface to these advisors and actions may be by any means adapted to the subscriber's requirements, such as sequential list of centers grouping current and prospective clients separately. See FIG. 2. Each such group might contain a list of further arbitrary sub containers or centers. But all of these will ultimately contain a set of completed actions, which may be initially the empty set.

Echelons within the same Territory, may, but need not be, in a superior-subordinate relationship to each other, such as a sales manager and a sales representative.

The echelon entity provides different views of the advisors and actions in the system. The same user can have different roles within the system, and thus have access to a plurality of echelons, each of which will present him with only the subset of advisors and actions appropriate to that role. For example, the senior salesman in a particular territory might also have the role of a sales manager, each role presenting him with different access privileges.

User—a human user who logs in to the SalesHawk application by providing security credentials such as name and password to the access URL or "launch page". The user may have access to one or more echelons via the same launch page. The set of solution, subscriber, channel, silo and territory may be thought of as a role. The same user may have one or more roles, allowing flexibility in granting and revoking access privileges.

This hierarchical structure provides a framework which is consistent and flexible, extensible and collapsible. It allows the sharing or reuse of static resources within a particular solution-subscriber customization, as well as the sharing of abstract software assets between solutions and subscribers. This allows software patches, modifications and improvements to the solution to be deployed readily across numerous subscribers, simplifying the maintenance of numerous customized applications.

This hierarchical structure also provides a means of certain navigation within HAWK applications. This navigation interface is useful to human users in moving between different activities in different levels or branches of a single solution as well as moving between different solutions without extensive re-training. It is also used by software entities within and between solutions to communicate with each other and with users. This common interface allows flexibility to migrate functionality from users to software entities of varying sophistication within the system as subscriber needs, business processes or the state of the art change. Thus, immature business processes can be performed manually by users, incrementally refined and perfected, then delegated to software entities, which might be further refined to take advantage of new, improved or different modes of artificial intelligence or "knowledge".

Advisor Agents—Abstract View

In the present preferred embodiment, all echelons use a common format to represent the unique view provided to users in their various roles within a solution. The echelon view typically contains a set of centers, each of which is the domain of some set of advisor(s). For example, the CEO does not ordinarily need to have access to all information about every client, prospect or sale at his company, so the executive echelon contains only analysis and report centers, which are adapted to a high-level summary view of all sales activity taking place in the company, including that of in-house employee sales personnel as well as independent contractors serving as sales "affiliates". See FIG. 3a. This information might be economically sensitive and therefore need to be closely held. Rank and file personnel should not have access to it.

By contrast, a wholesale sales representative does need to have access to information about clients, prospects or sales, at least his own. He can also benefit from company-wide broadcasts of information related to sales, such as price schedules, promotions, press releases and so on. Further, like the CEO, he can benefit from the analysis of sales information, but only to the extent of comparing his current year's performance with last year's or with his quota. Accordingly, the wholesale sales representative echelon contains a wholesale sales support center, which contains wholesale price schedules and promotion information, and a message center with information, such as press releases, common to all sales people. FIG. 3b. This echelon also has an analysis center controlled by the same advisor as the executive's analysis center. However, since the employee sales representative has different analysis requirements than the CEO, the analysis advisor's actions in the sales representative's echelon context operate upon different templates from those upon which the same Analysis advisor operates in the executive echelon.

A retail sales affiliate is an independent contractor, for example a storefront retailer in a shopping mall. Like the wholesale sales representative, the affiliate needs access to current product, price and promotion information, a list of its customers and so on. But unlike the wholesale sales representative, who is an employee, the affiliate may not require any analysis capabilities and should have access to retail price schedules but not wholesale price schedules. Accordingly, the retail sales affiliate echelon might contain the same message center as the wholesale sales representative echelon, but a retail support center instead of the wholesale support center, with sales material adapted to the requirements of retail sales. FIG. 3b, FIG. 3c.

Similar logic applies to the varying activities of sales managers, marketers, finance and other personnel. FIGS. 3d-3f. The ability of the same advisor to take the same action in different echelons but acting upon different Templates depending upon the context provides a novel and efficient modular mode of both controlling access to sensitive subscriber information and providing for the reuse of source code in the advisors to provide and improve common functionality. See FIG. 4.

The structure within an echelon that contains the advisors and their actions is not an essential feature of the invention. The present embodiment uses a sequential list called "centers" which in turn contain other containers such as buttons invoking advisors and lists of actions, sometimes separated into sequential lists presented under tabs. The containment structure might also be by hierarchical tree structures, wizards, or any of a plurality of common data structures presented in any of a plurality of user interface modes supported by the art, all as dictated by the particular subscribers' requirements. The essential features of an echelon are that it contains an appropriate set of advisors, a set of the actions taken by those advisors, and, if required, the ability to work with templates appropriate to the requirements of that echelon. See FIG. 2.

An advisor is a software entity that has the knowledge and data (or knows how to get the knowledge and data) to perform an action. An advisor for a particular type of action is a single logical entity. In the presently preferred embodiment this entity typically consists of a software engine, such as one consisting of one or more classes programmed in the Java programming language, which takes its unique configuration from knowledge described in a knowledge descriptor document, for example, one written in XML (KDX). This separation of knowledge from source code provides the ability to reuse the same compiled source code in a plurality of advisors by substituting a different KDX document.

This software engine might be instantiated in physical memory multiple times for multiple users in multiple sessions across multiple subscribers or solutions, but it is logically a single entity. This advisor entity manages all actions of a particular type such as the Analysis Advisor which manages both executive and sales analysis. See FIGS. 4, 5b, 6a, and 6b. This allows actions to be linked in a variety of ways to share information if necessary.

An advisor acts as an intermediary between a user and the data relevant to the action the user seeks to take, pointing out gaps in essential data, filling in gaps in that data where it is available from actions under the advisor's control, locating content for the action, linking to other related actions, and in some cases offering suggestions or guidance where the action to be undertaken can benefit from knowledge.

Furthermore, an advisor can also suggest that the user consult other advisors to take other actions suggested by its own immediate action. For example, upon completion of creating a Meeting Agenda action, the Meeting advisor, detecting that the place of the meeting is at corporate headquarters, might suggest that the user invoke a conference room scheduling advisor to reserve a room, or might take the initiative to consult the conference room scheduling advisor itself and make the reservation or alert the user to a scheduling conflict if it is unable to do so because is has detected conference room scheduling actions previously completed by other users for the selected date and time.

Figure 9:
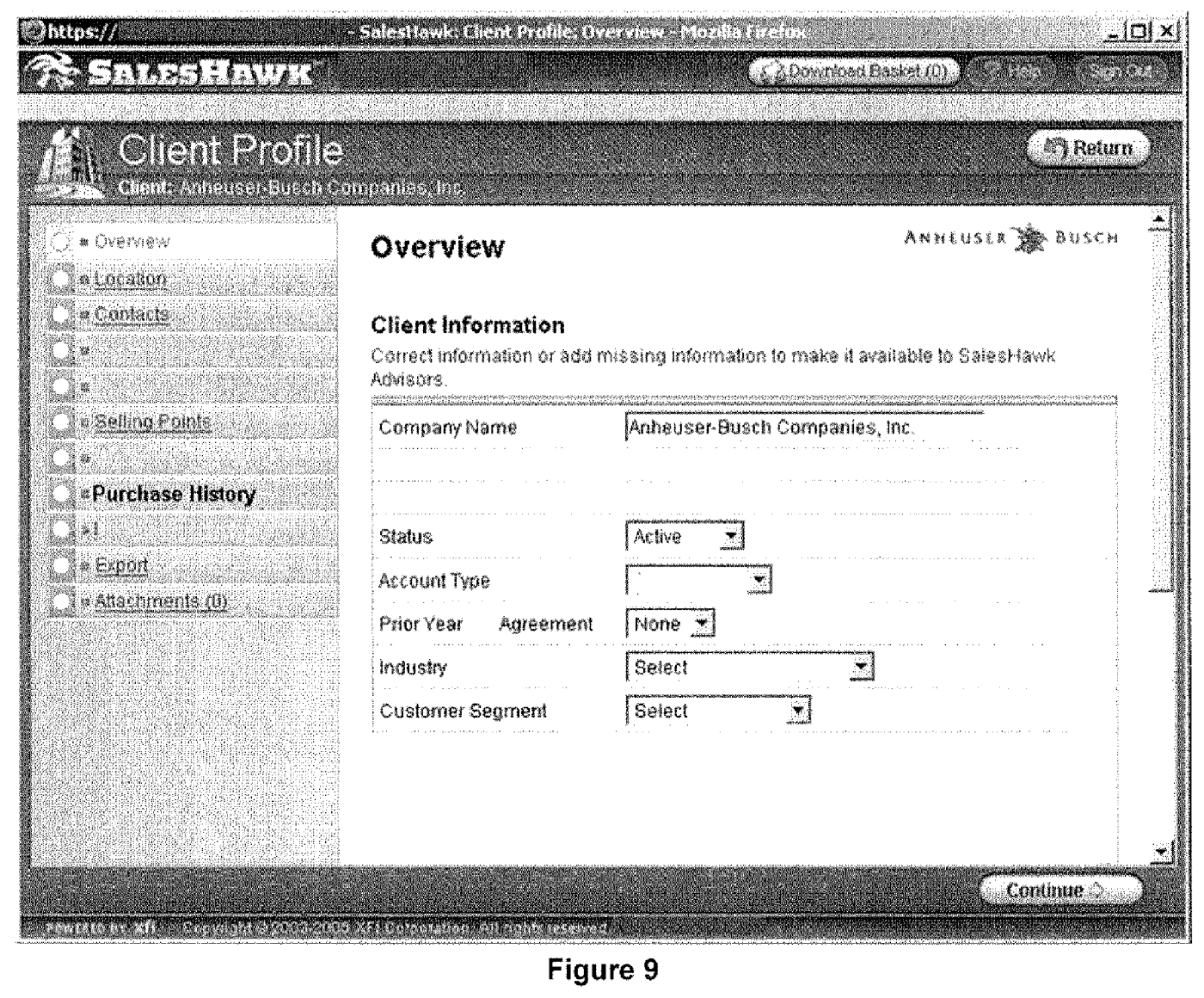

This is an important nexus between artificial intelligence (or knowledge) and the HAWK application. Advisors can be as simple and predictable as a hard-coded series of dialog boxes commonly called a "wizard" when this is all that is called for. See, e.g. FIG. 9. Or they can provide different information or suggestions at different times based on dynamically updated data sources such as commodities market information. Or they can "learn" from the prior actions of the same or other users in the same or other solutions. Or they can engage in any sort of interaction the state of the art of artificial intelligence allows, potentially even as sophisticated as posing as another user, live technical support personnel, or role-playing a potential customer in a sales pitch rehearsal.

The knowledge an advisor manifests can be provided by any means in the state of the art, for example rules-based expert systems (including Xference systems), fuzzy logic, and neural networks. The knowledge can be modified without affecting the source code structure of the advisor or the interface of the advisor with the rest of the system. Completely different knowledge data or modes might be swapped in and out of an advisor, potentially at runtime, without necessarily affecting the user interface or internal system interfaces in any manner whatever. The artificial intelligence functionality or knowledge is encapsulated within the advisor in accordance with ordinary principals of object oriented software design.

An action is a software entity created by an advisor in response to a user request and incorporating all necessary data from a variety of available sources: prior user input to the advisor, relational database tables, LDAP (Lightweight Directory Access Protocol) databases, flat text files, or static image or audio visual files. Most important, an action can take input from other actions, created by other advisors in other locations of the same or another solution. This is a fundamental difference between a HAWK application and the prior art. Enterprise software applications such as CRM systems are fundamentally form interfaces to relational database tables. These systems may be more or less complex, sophisticated, and skillfully executed, but they are fundamentally forms that edit data in tables. The idea of non-deterministic results or communication between entities represented by these tables is absent from the prior art.

Actions may act upon templates where the same action can take place with different echelons with different security, presentation or other requirements. An example of a simple action is a Microsoft PowerPoint document template which is merged with data from a variety of data sources. The resulting PowerPoint presentation is then wrapped in the action and becomes its "export" or "payload".

An action may sometimes be taken and successfully completed without leaving any serialized artifact within the HAWK system. For example, a hypothetical action might do nothing more than send a confirmation email to or from a user via ordinary network means, without permanently retaining a copy of the email or proof of its delivery in the HAWK system.

An action's payload can be any information which may be conveyed in a digital medium, including email, voice mail, fax, and text in addition to the familiar desktop office suite formats such as PDF files, spreadsheets and graphical slide presentations. The action can contain as payload incoming objects created outside the HAWK application, such as service requests from customers.

However, when a user causes an advisor to take an action, and the action is successfully completed, the action is ordinarily serialized to some persistent storage medium such as a disk file, relational database, or LDAP or other data storage. When the user's session terminates and a subsequent session is started, the action is available in its latest state. The user can delete an action or cause the appropriate advisor to modify it. The action can thus be thought of as both a process and the tangible result of that process. See FIGS. 6a, 6b, and 7.

Advisors—A Taxonomy in SalesHawk

SalesHawk is composed of intelligent agents, referred to as advisors in SalesHawk. Each advisor has specific roles and responsibilities. Different sets of advisors can be made visible to the different user groups, thus providing enormous flexibility in customizing the user experience.

Advisors embody specialized knowledge relevant to each phase of the sales cycle and assist in building client deliverables including presentations, collateral, contracts, etc.

Advisors differ from what are commonly called "wizards" in modern graphical software interface design. A wizard is a static, preprogrammed set of dialog boxes that a user steps through to achieve some result. While the steps may be numerous and complicated, and different steps may appear in the sequence based on previous input, a wizard is fundamentally a complex, multi-page form used to complete a configuration within predetermined parameters.

Advisors are dynamic software entities that communicate with each other, with the SalesHawk system and with the user to produce non-deterministic outputs based on inputs from the user, the SalesHawk system and other advisors. Identical user inputs will sometimes result in a different set of steps and outputs. If, for example, market interest rates change, the financing incentive terms proposed by the deal advisor might differ. While the user experience may sometimes superficially resemble a wizard, the underlying process, and the set of advisors active in the process, are more complex and flexible.

All advisor actions are controlled by a super-advisor called the director. The director entity has 3 types of roles:

System facing roles that are invisible to the user. For example,

1) Communication between advisors—When a user provides input that calls an advisor, the director determines whether that advisor should interact with one or more other advisors. For example, for supporting information, limitations, or veto power. The advisor so called may in turn call other advisors until all actions taken by all advisors so called are complete and made available to the initial advisor.

Supervision, Negotiation and Arbitration—If an advisor sequence requires input from other advisors, the Director handles all communication between them, not simply passing messages back and forth, but preventing interference and arbitrating conflicts. For example, the deal advisor might propose that a particular finance incentive should be offered, where the financial review advisor might veto that incentive on grounds of corporate solvency. The director prevents this sort of deadlock by arbitrating a compromise or recognizing one advisor as having priority over another. This supervisory functionality of the Director may be accomplished by means of knowledge appropriate to the kind of advisors immediately concerned. In some cases a rules-based system of precedence might be appropriate; in other cases a fuzzy logic solution might be adopted. The particular mode of knowledge used in a particular supervisory context might itself be determined by the application of knowledge within the director entity itself.

3) User facing role—the Director communicates with and tutors the user through a process resulting in some output, For example, a meeting agenda action. See FIG. 7.

Figure 7:
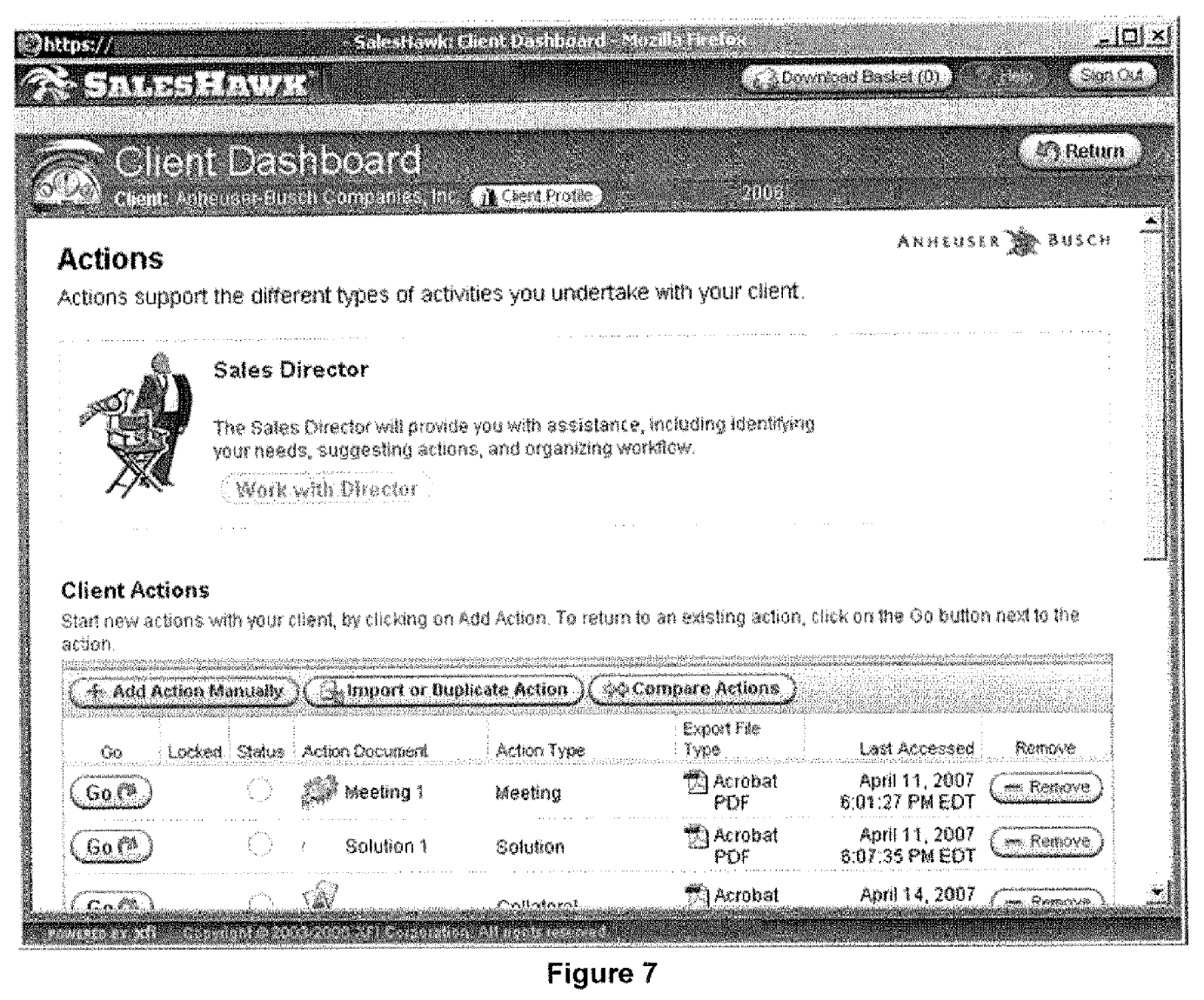
Figure 8:
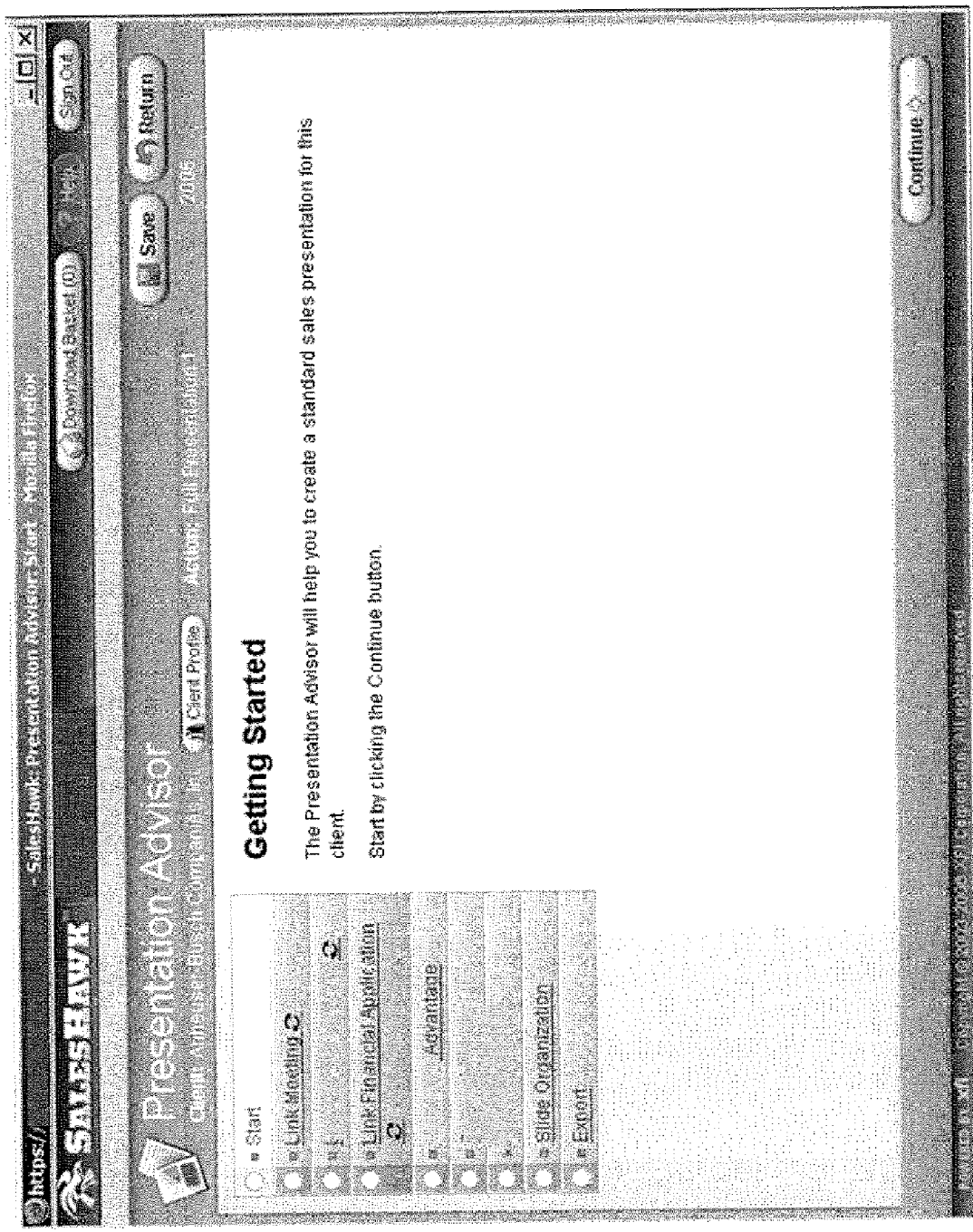
FIG. 8 is a screen capture showing the graphical representation of a presentation advisor.

User Interface—The Director is sometimes associated with the "personality" of SalesHawk, represented by the HAWK Man image. See FIG. 7. In a presently preferred embodiment, this is the only graphical representation of the advisors the user will see. When a particular advisor has been called by the Director in response to a user input, this may be shown by the presence of a small icon associated with the action. See FIG. 8. In some cases, the involvement of an advisor might be indicated by textual means. See FIG. 8. In other cases, the user interface will give no indication whatever of the advisor's instantiation.

Common or Subordinate or Simple advisors fall into 2 broad categories:

Assistants—These are the more mechanical of the advisors, designed to handle a specific task. For example, the contract advisor will take customer information and deal terms previously determined (by the user and other advisors) and step the user through producing and downloading a text document ready for printing and signature. This allows the sales representative to concentrate on higher value activities while producing better more professional sales collateral.

Area or Discipline advisors—These advisors take a broad view of a particular area of concern, possibly integrating information from disparate sources into the process. For example, the Guardian advisor, on noting that a sales rep is preparing a proposal for a current customer of longstanding, might spontaneously suggest a discount or incentive to preempt those of a competitor. See FIG. 5*d*.

A HAWK solution could be deployed in multiple domains (For example SalesHawk, MarketingHawk, SupportHawk, etc.). In this document, we use SalesHawk as the exemplary context, but the HAWK functionality is not limited to those provided by a solution in the domain of sales.

A HAWK solution is fundamentally a user interface to a set of advisors including a single Director instance. In the presently preferred embodiment, this interface is through dynamically created HTML produced by a means such as a Java Web Application and accessed via the Internet or other network communication means via a common browser. But a HAWK solution might use any user interface whatsoever, for example, simple text or audio. Furthermore, the user (or in this context perhaps "client") might not be a human user at all but rather another set of computer process(es) running on the same or other physical processors and interfacing with the HAWK solution through binary or any other interprocess communication means either over a computer network means such as Remote Procedure Calls (RPC) or local interprocess communication means.

Figure 10A:
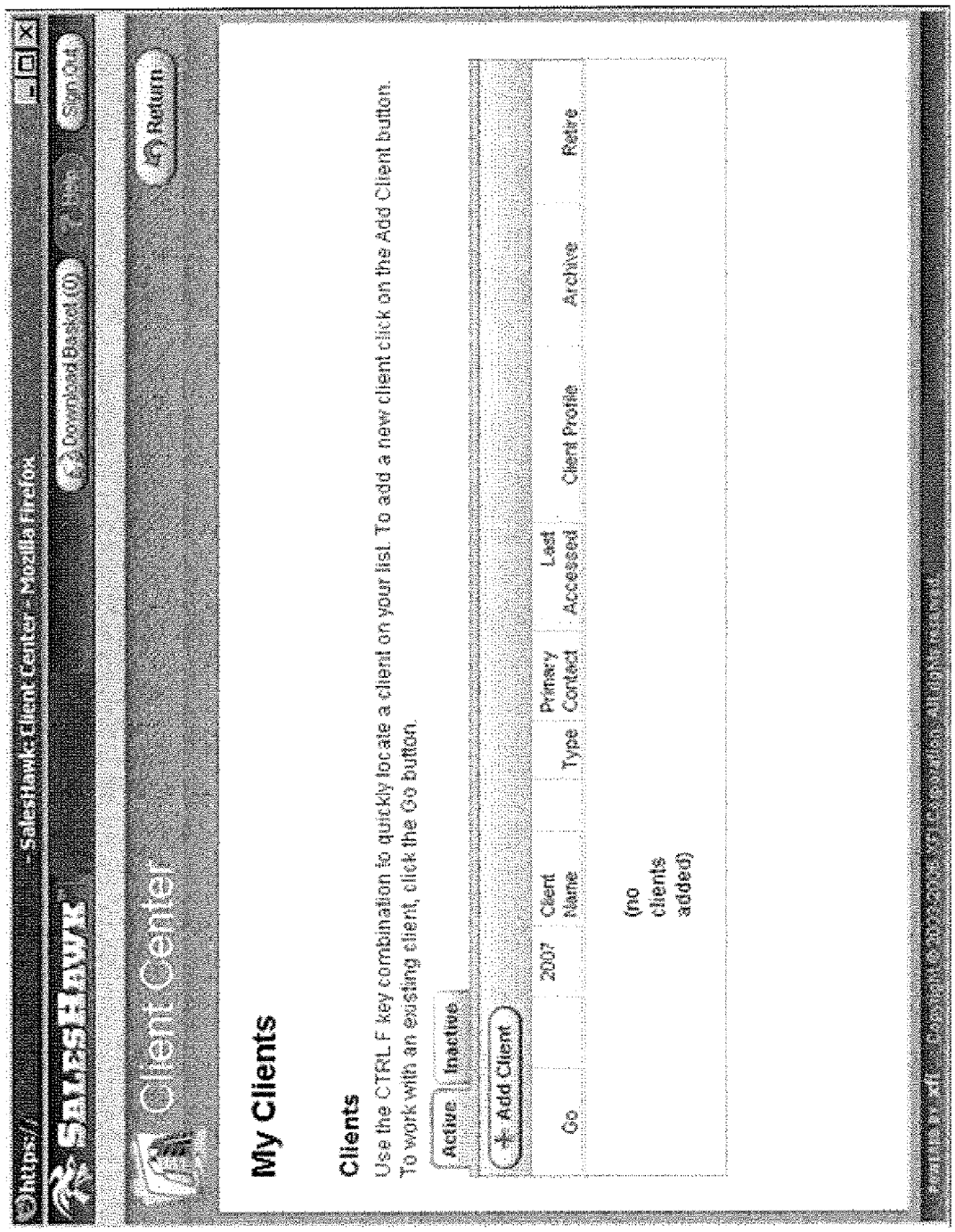
FIGS. 10a-10p is a series of screen capture showing the addition of a client profile action and the creation of a meeting action under the control of the meeting advisor.

All advisors have certain high-level functionality in common, whether the context is sales, marketing, management, analytics, tech support or any other domain. This common functionality, especially when combined with knowledge is a novel difference between an advisor and an ordinary software wizard. Advisors always make sure the final work is coherent, valid, appropriate, and effective. Some key features of this functionality are:

Advisors create one or more action instances (herein "action"). The action/advisor relationship is analogous to Application/Document or Class/Object design patterns. For example, the meeting advisor creates a meeting action for every meeting. FIG. 10*a*.

The set of actions capable of being created by a single advisor can be of multiple types. For example, the presentation advisor can prepare a full presentation in PowerPoint or similar graphical slide show format, as well as an executive presentation in PDF or other textual format. Furthermore, each such type of action could have multiple templates to match different requirements. For example, the same executive presentation in a subscriber's sales department might be preferred in graphical format, but when prepared by the CEO for the Board of Directors might be in textual format. See FIG. 10*f*.

Advisors manage data, knowledge, and content on their topic of authority. This knowledge could be explicit static rules (such as crisp or fuzzy Xference rules) or inferred rules (such as those in Xference), experience rules (such as those collected through artificial neural networks), or user preference rules.

Advisors merge and adapt information from different sources. Possible sources of this information is explicit information provided to Hawk, information that HAWK accumulates as the result of its operations, feeds from other systems that HAWK is integrated with (such as enterprise systems), public-domain data, or third-party proprietary data accessible to Hawk.

Advisors import knowledge and data from other advisors and can create knowledge to be used by other advisors. Every advisor has an interface through which it publishes certain knowledge that might be useful to other advisors. These interfaces are employed by an advisor to feed certain results to another advisor for creation of actionable items (for example, the objection advisor will invoke a communication advisor to create a proper response). Or, it is placed in a registry for the other advisors to access as needed (this is quintessentially done by the Profile advisor). Typically, an action will "link" to many other actions (usually from other advisors) to perform its task, for example, a presentation action uses a re-existing solution action).

Advisors assist users in building action content through suggesting reasonable alternatives where appropriate. The users interacts recursively with the advisor until the content is created. This process could be as easy as a one-button automatic build (for example use the customer's profile to suggest a complete solution), or an elaborate collaboration between the user and the advisor to customize a plurality of aspects of an action (for example picking the best feature of the product to include in a comparison).

Advisors can suggest forms for delivery of the content. Sometimes this is picking the best presentation template or a theme, or a selection of a negotiation methodology, or a high level decision on how to best respond to an objection (send an email through the communication advisor, or create and transmit a piece of collateral, or schedule a meeting and make a presentation).

Advisors fit the content to fit in the selected form. For example, the analytics advisor will adapt the content to fit into the proper report format selected, or the communications advisor will intelligently merge the "points to be communicated" (the content) with the communication template that is selected and customized for a particular echelon.

Advisors always make sure the completed action is coherent within the context of the HAWK application, and in the case of an advisor utilizing artificial intelligence means or knowledge, valid, appropriate, and effective. The director makes sure that the assembly of all actions makes sense for the proper stage of the interactions with the user.

Advisors intelligently manage the workflow. For example certain actions need one or more approval stages with dynamic thresholds that triggers them in accordance with subscriber-specific business processes.

FIG. 5 describes advisors and actions are adapted to the presently preferred embodiment of a hypothetical Sales Resource Automation (SRA) solution for a computer manufacturing company.

WORKING EXAMPLES

Some of the novel features and advantages of the presently preferred embodiment of a SalesHawk application can be demonstrated by a series of use cases for users within different echelons in a hypothetical Alpha Corporation which sells personal computers through both retail and wholesale channels to both business and consumer customers.

Use Case—Meeting Advisor—Wholesale Sales Representative Echelon

Figure 10B:
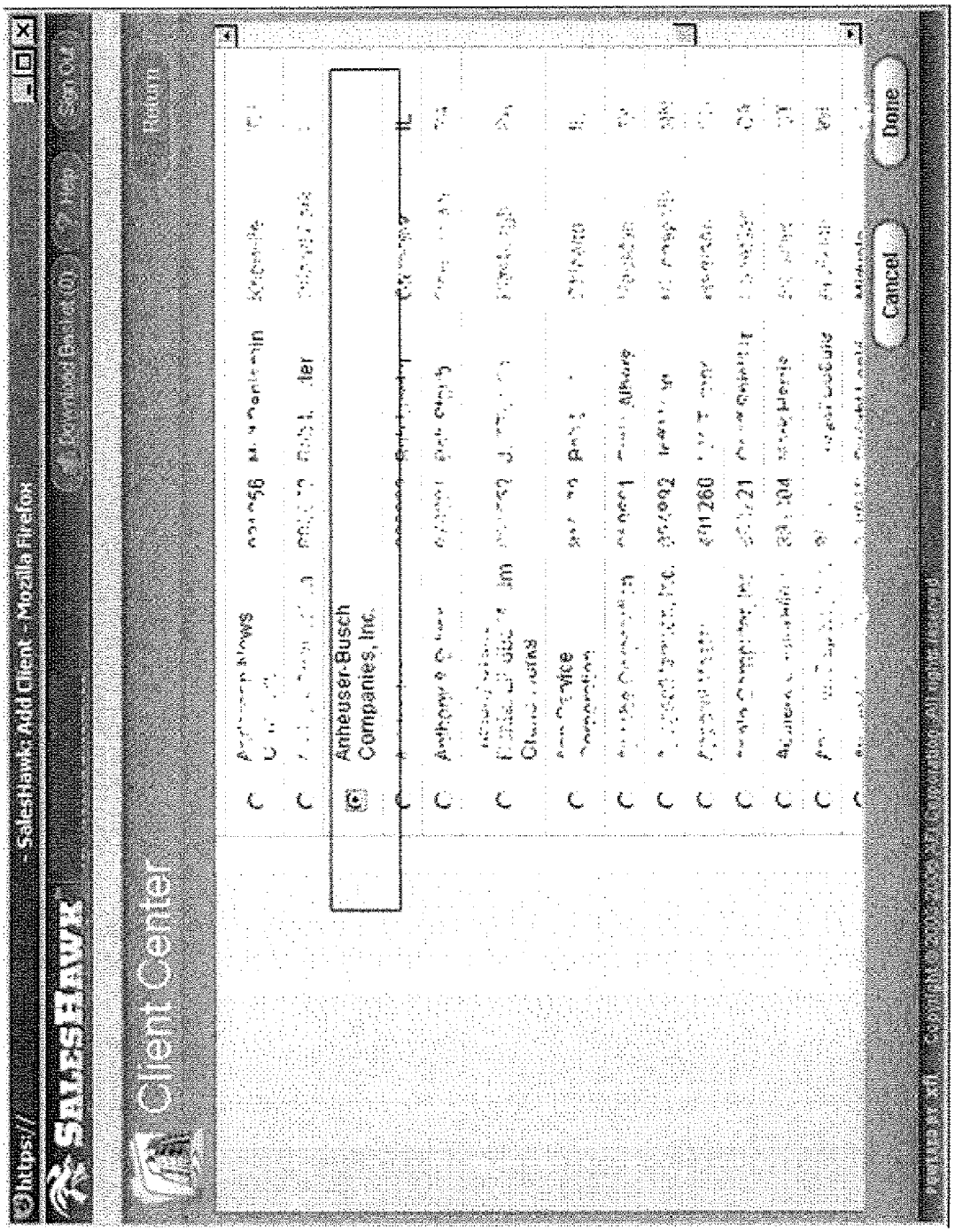
Figure 10D:
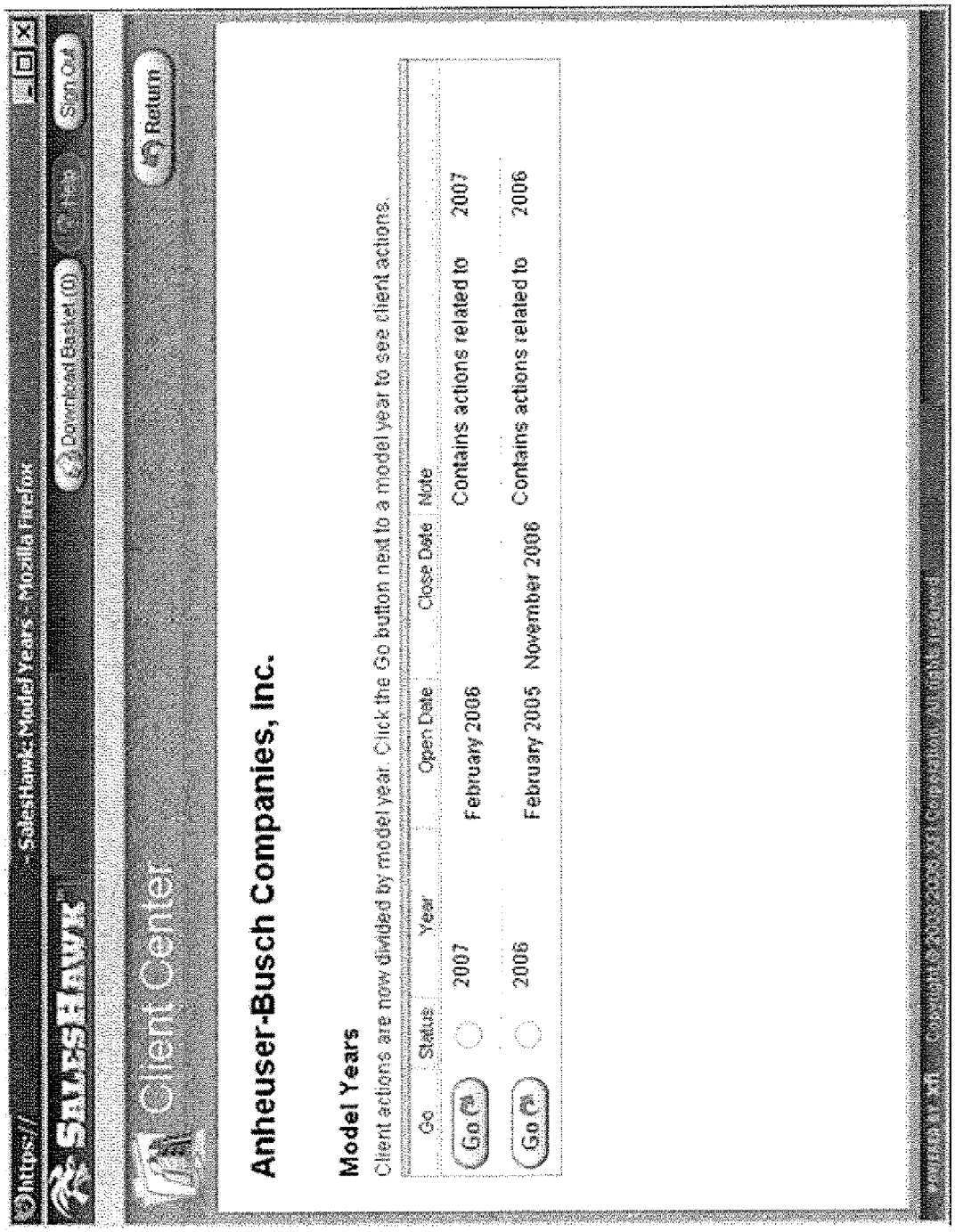
Figure 10F:
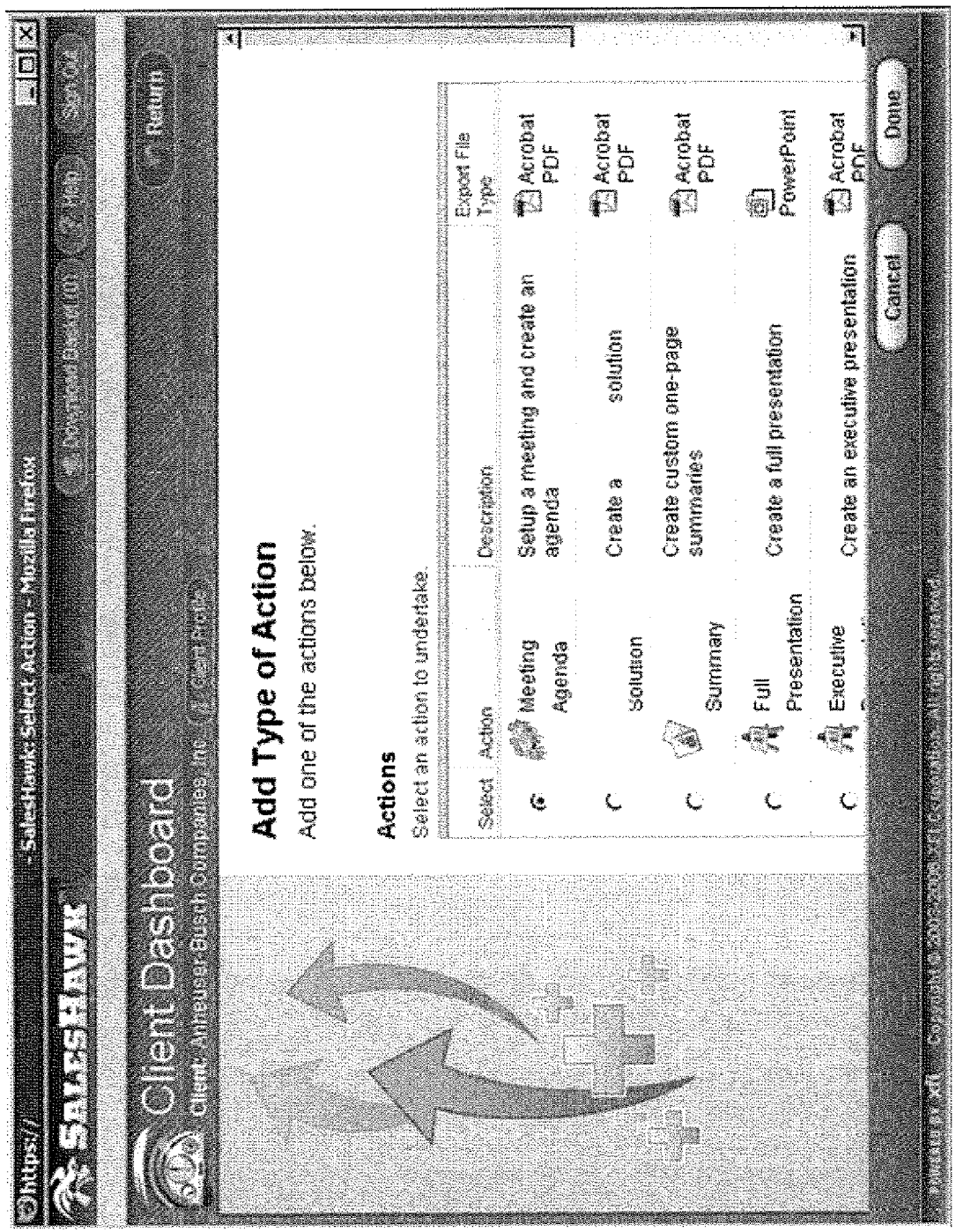

In this example a sales representative goes through all actions necessary to add a prospective client to his accounts and prepare an initial sales presentation meeting, including the production of one artifact created by a Meeting Advisor—a written meeting agenda which is the payload of a meeting action:

In FIG. 10a the user is presented with an empty client center, and on clicking the Add client button is taken to FIG. 10b in which the Meeting Advisor presents him with a list of known potential clients. On clicking radio button to select a client user is returned to his client center with the new client added. On clicking the Go button, the user is taken to a subscriber-specific arbitrary branch collection which divides the subscriber's product line into 2 product years 2006 and 2007. FIG. 10c. On clicking product year 2007 Go button 10-d, the User is taken to subscriber-specific arbitrary container, which shows that no actions have been taken for this client and product year. FIG. 10a. The user's interaction here is under the control of the director advisor. On clicking the Add Action FIG. 10f, the user is presented with a number of possible actions which might be taken with respect to the client (Meeting Agenda, Product Solution, Product Summary, Full or Executive Presentations), each of which is the domain of its corresponding advisor. FIG. 10f. On selecting Meeting Agenda, the user is taken back to FIG. 10a, and on clicking Go on the newly added Meeting Action is taken to FIG. 10h.

Figure 10C:
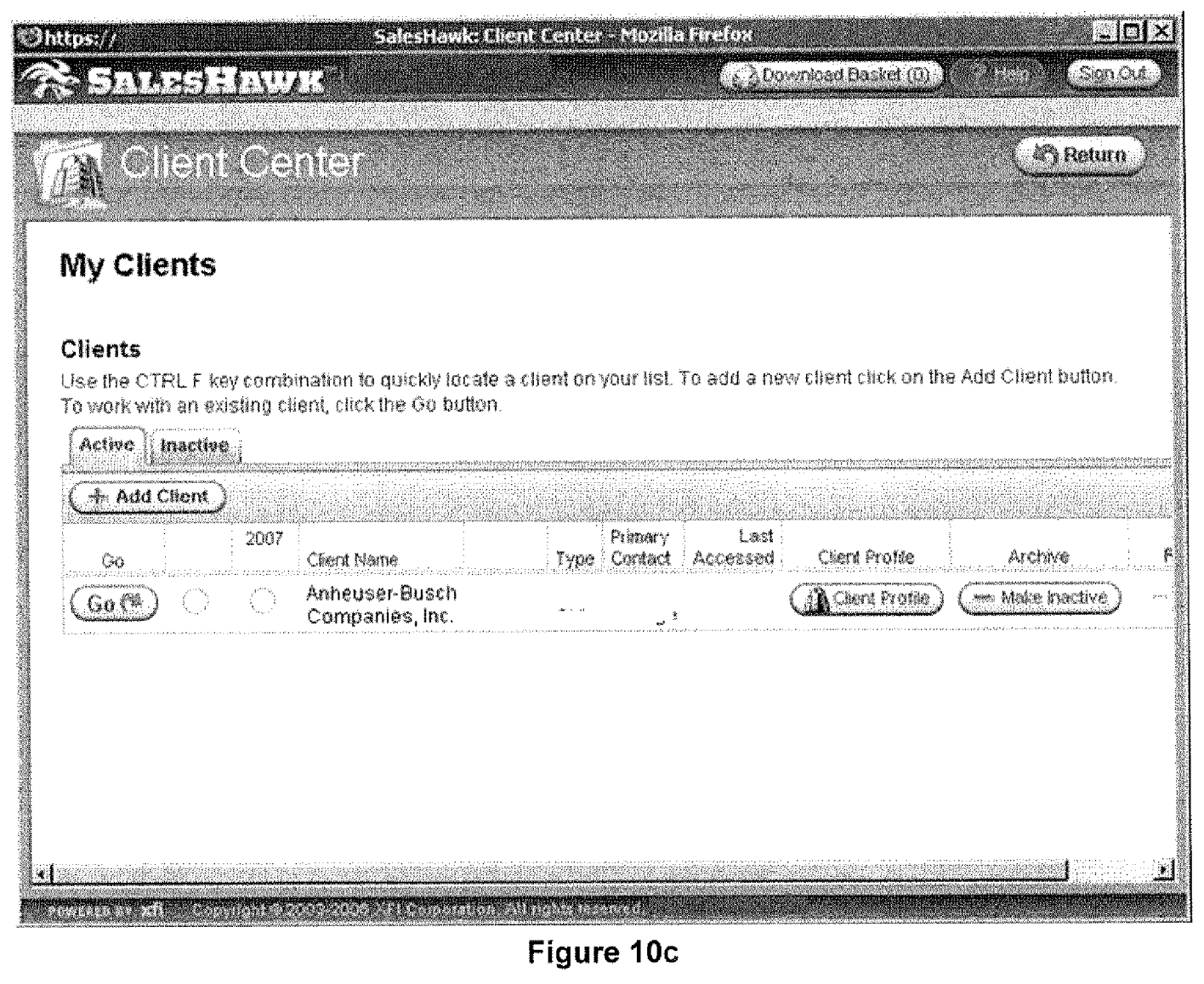
Figure 10E:
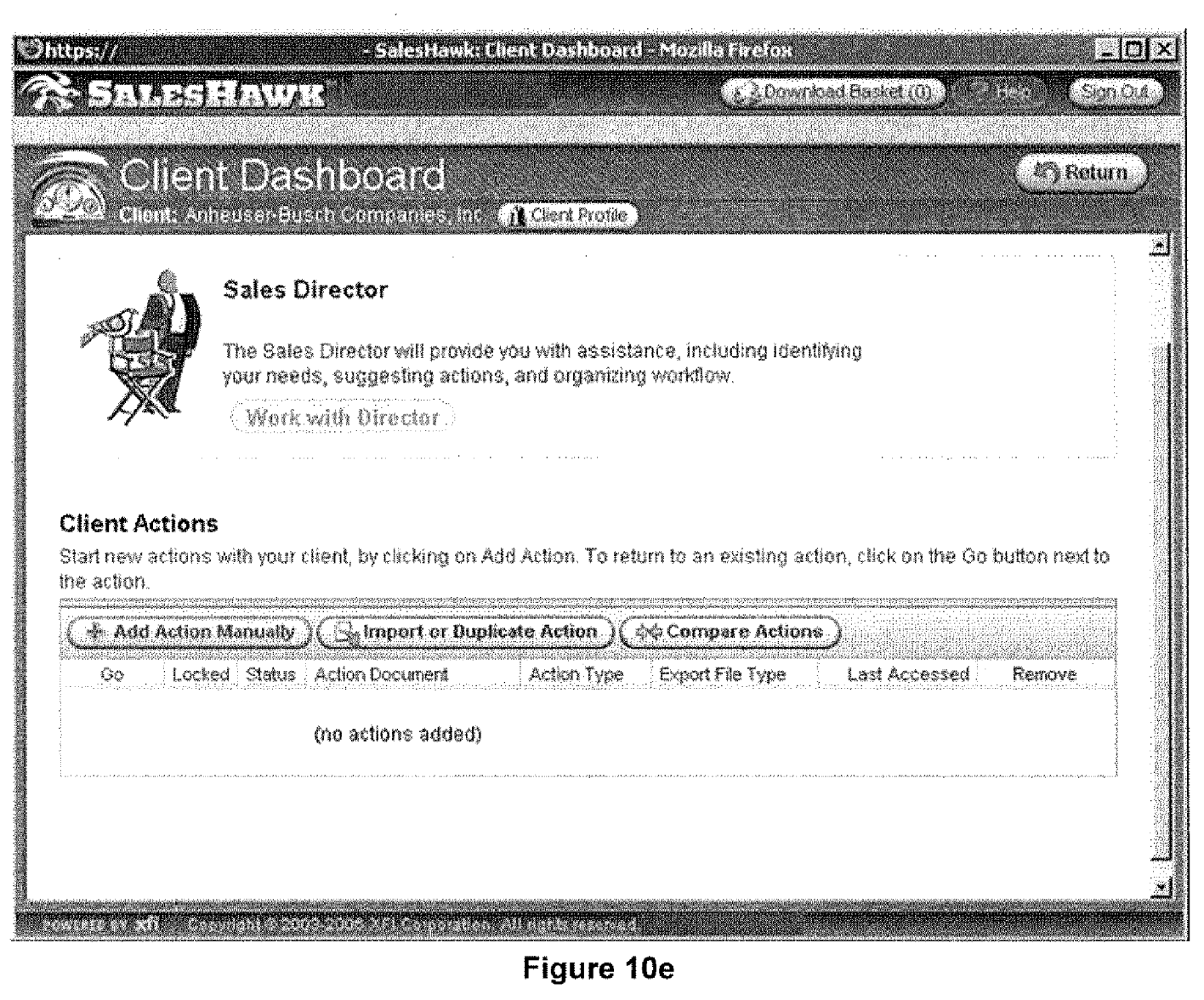
Figure 10G:
Figure 10H:
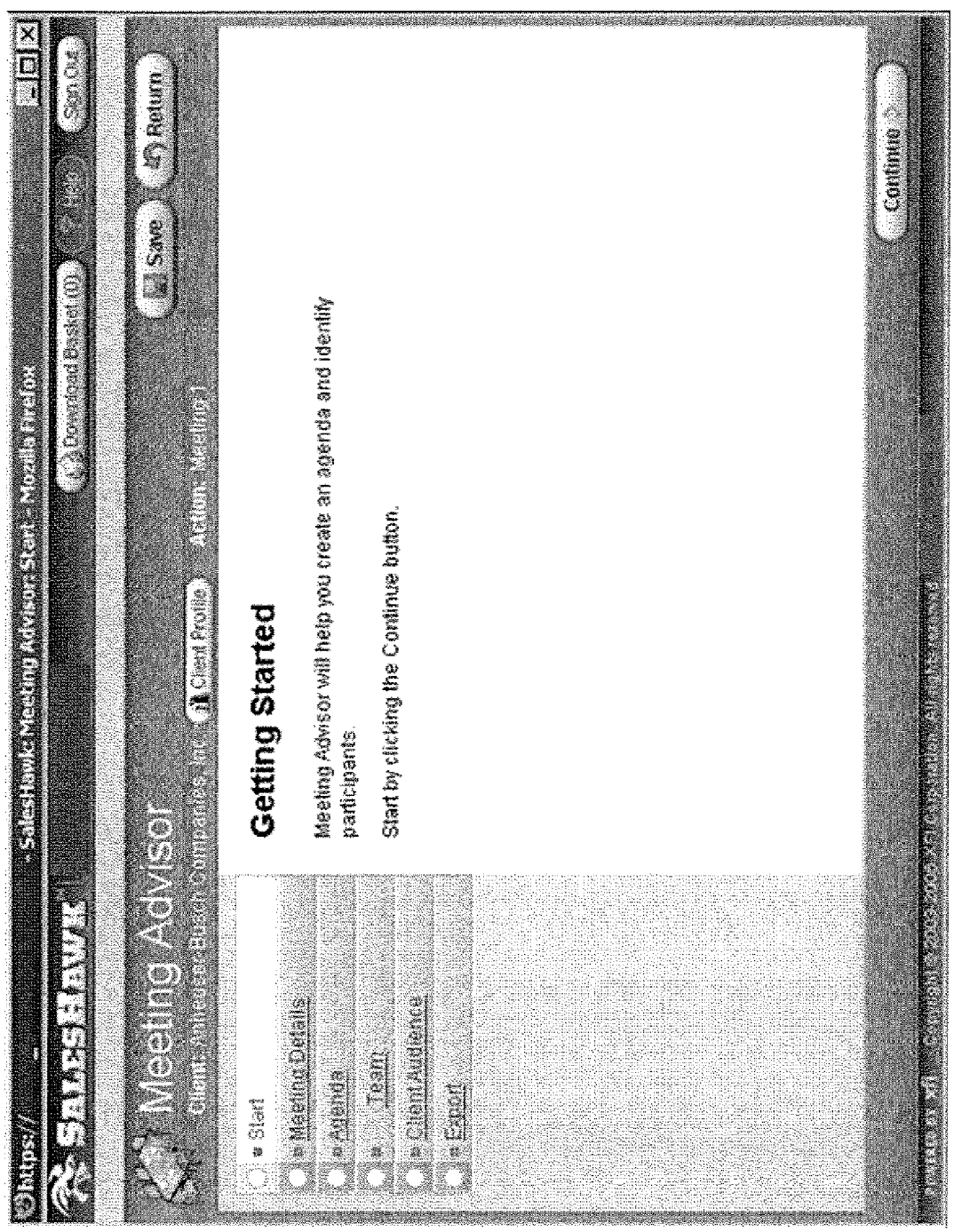
Figure 10I:
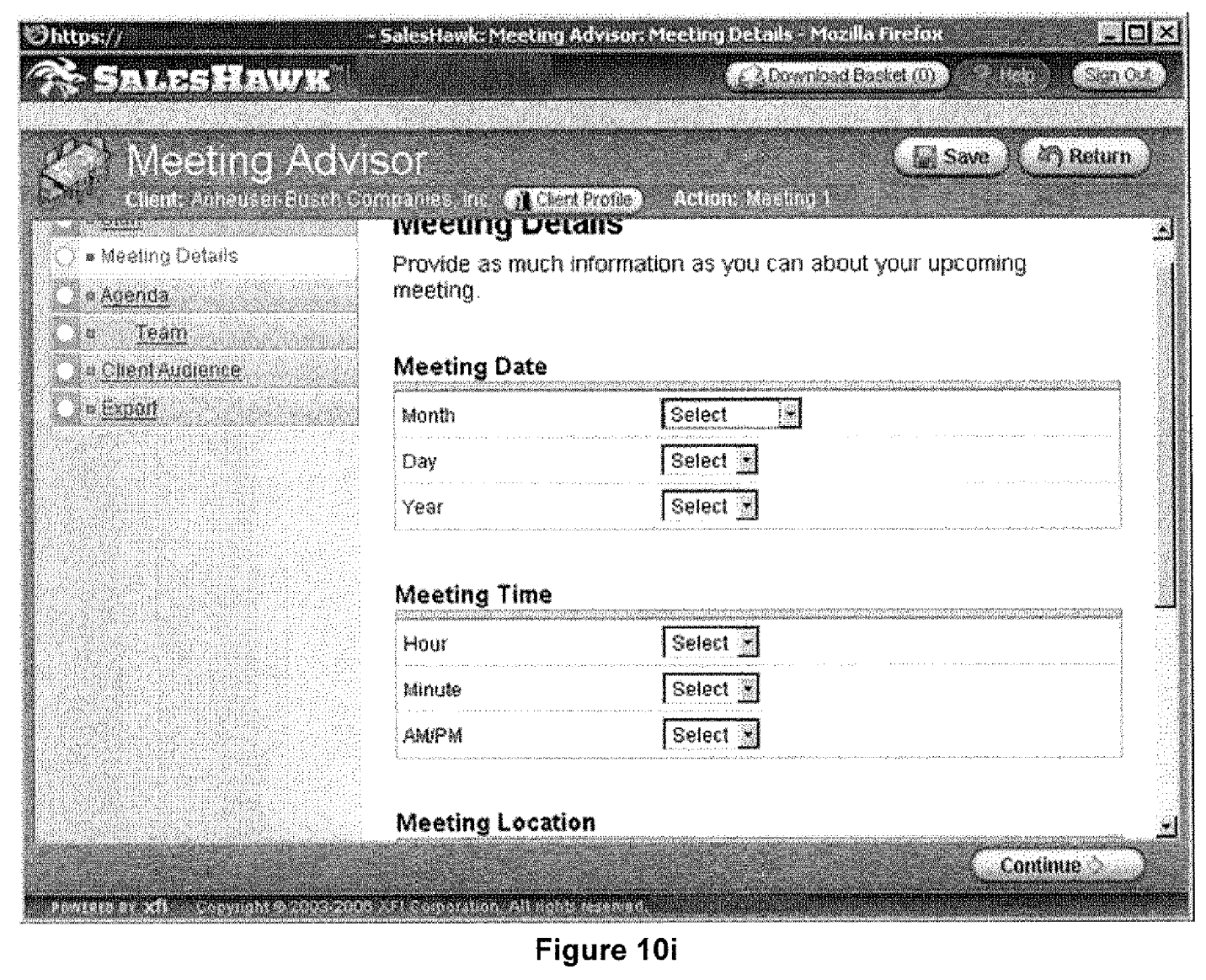
Figure 10J:
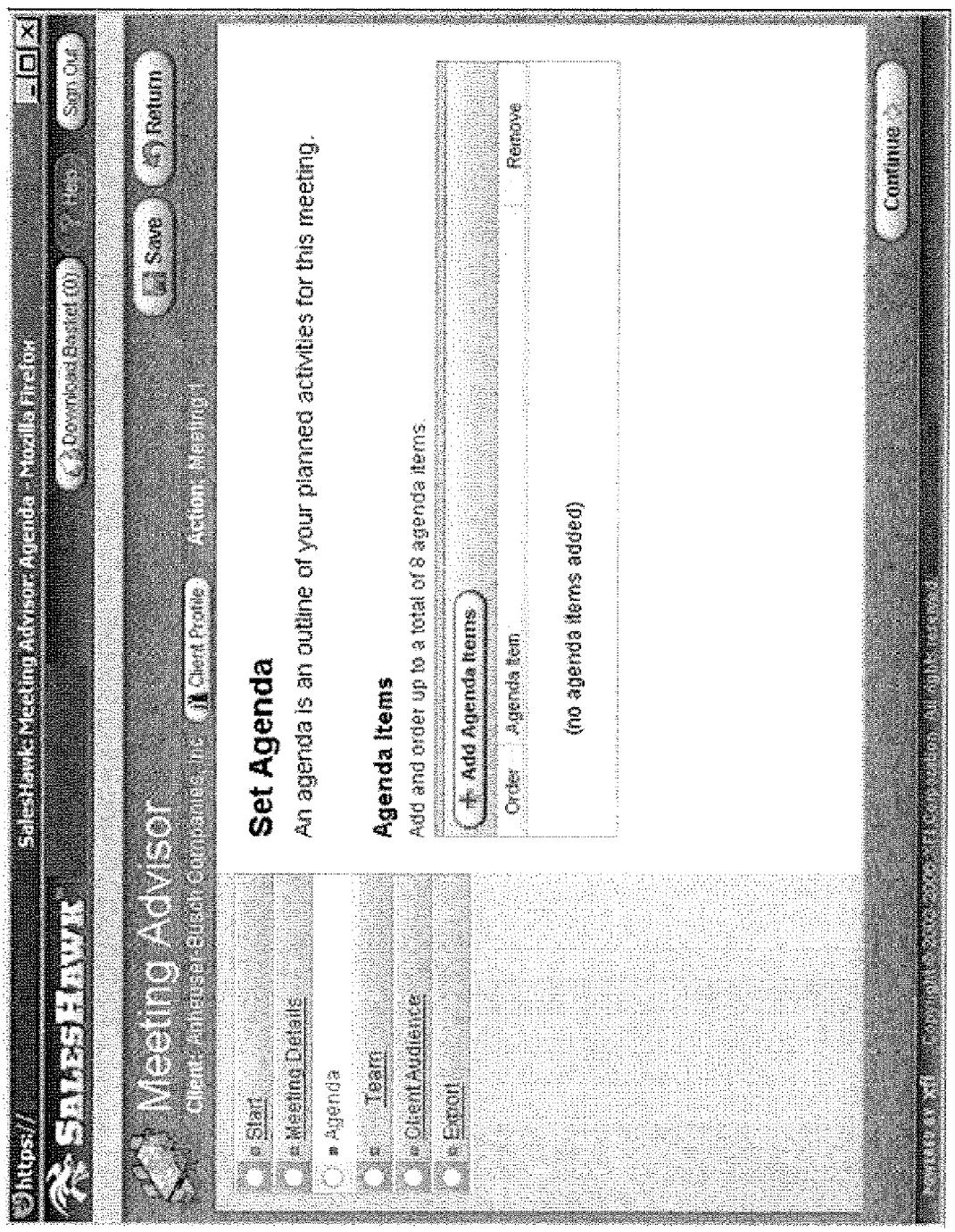
Figure 10K:
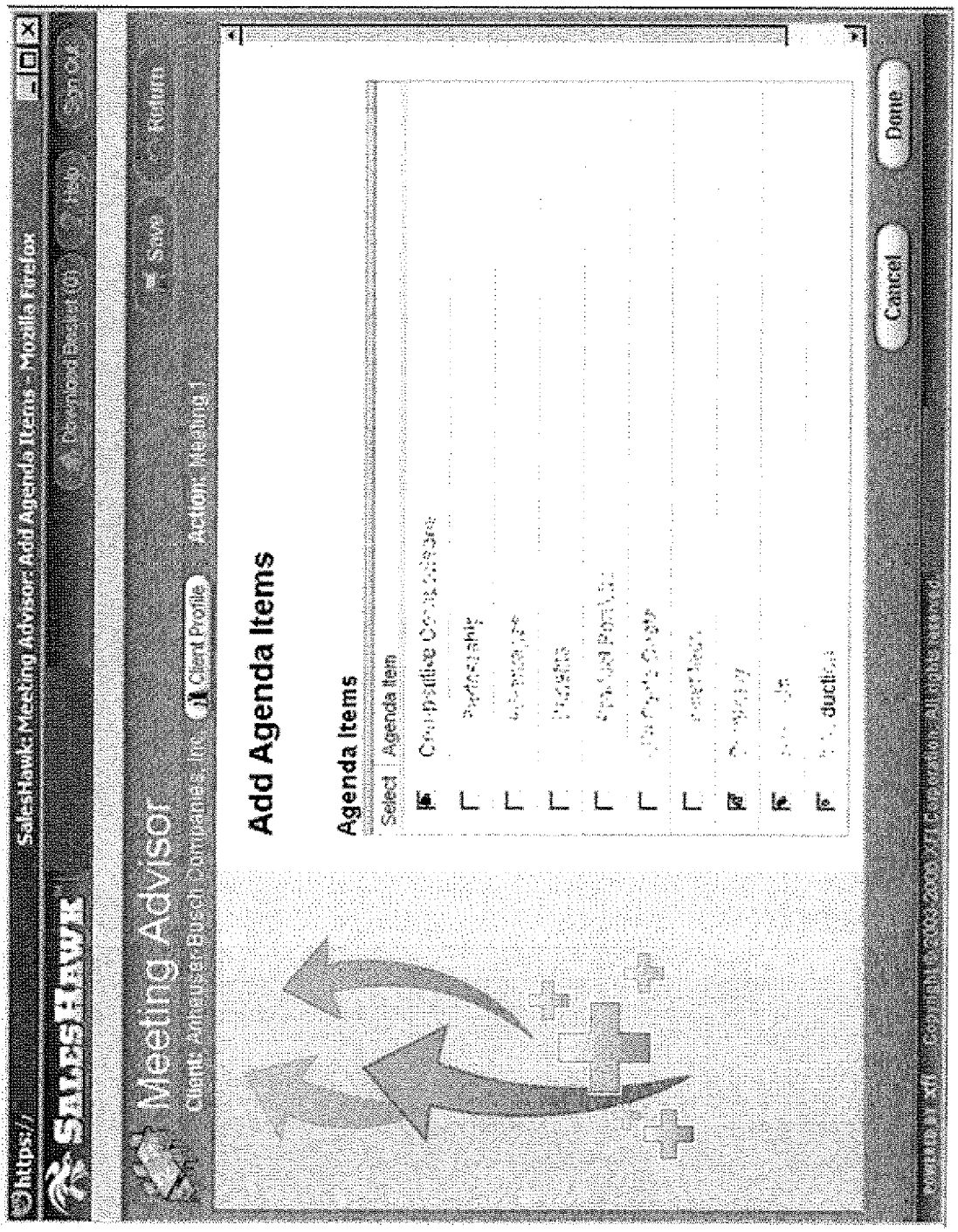
Figure 10I:
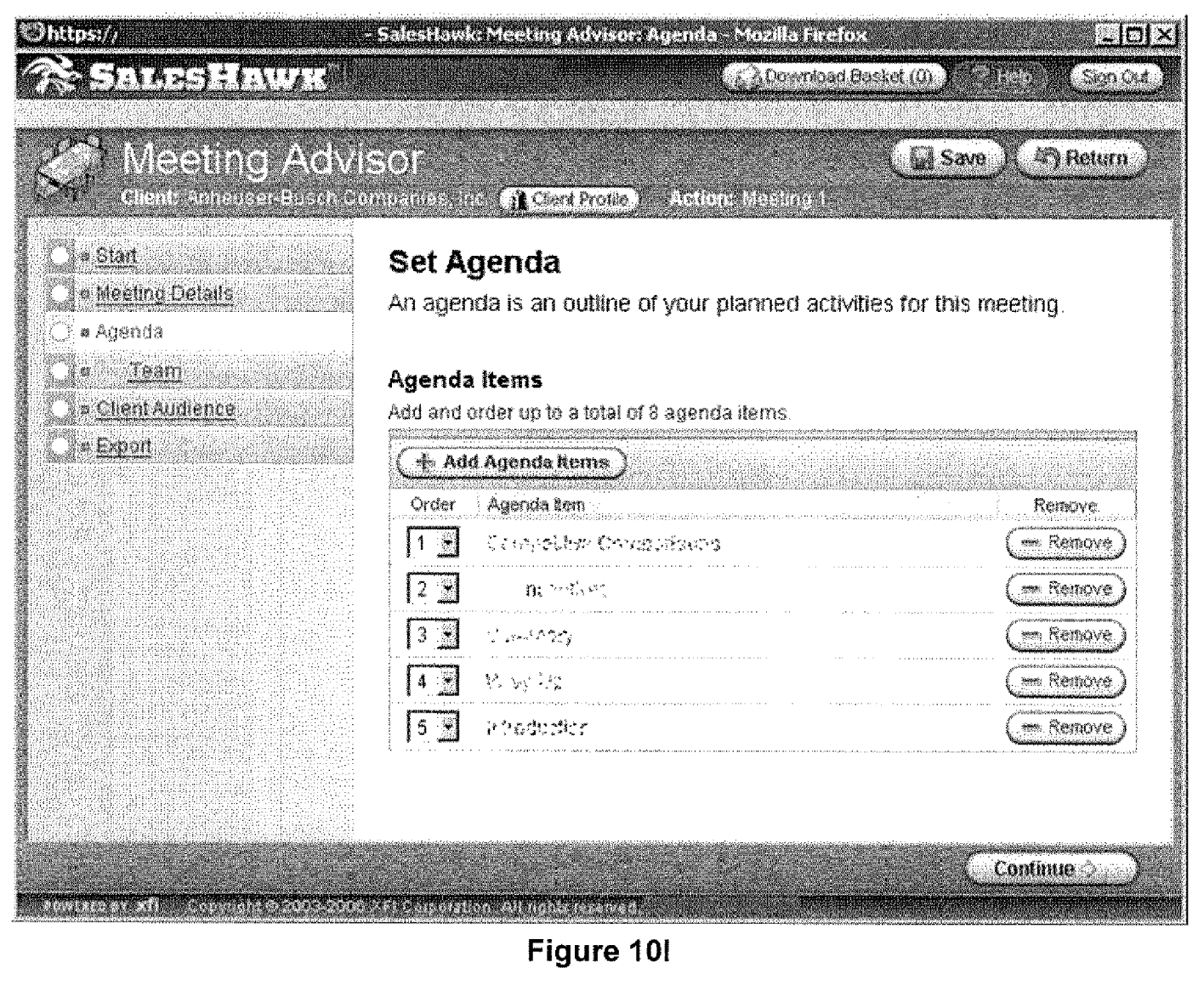
Figure 10M:
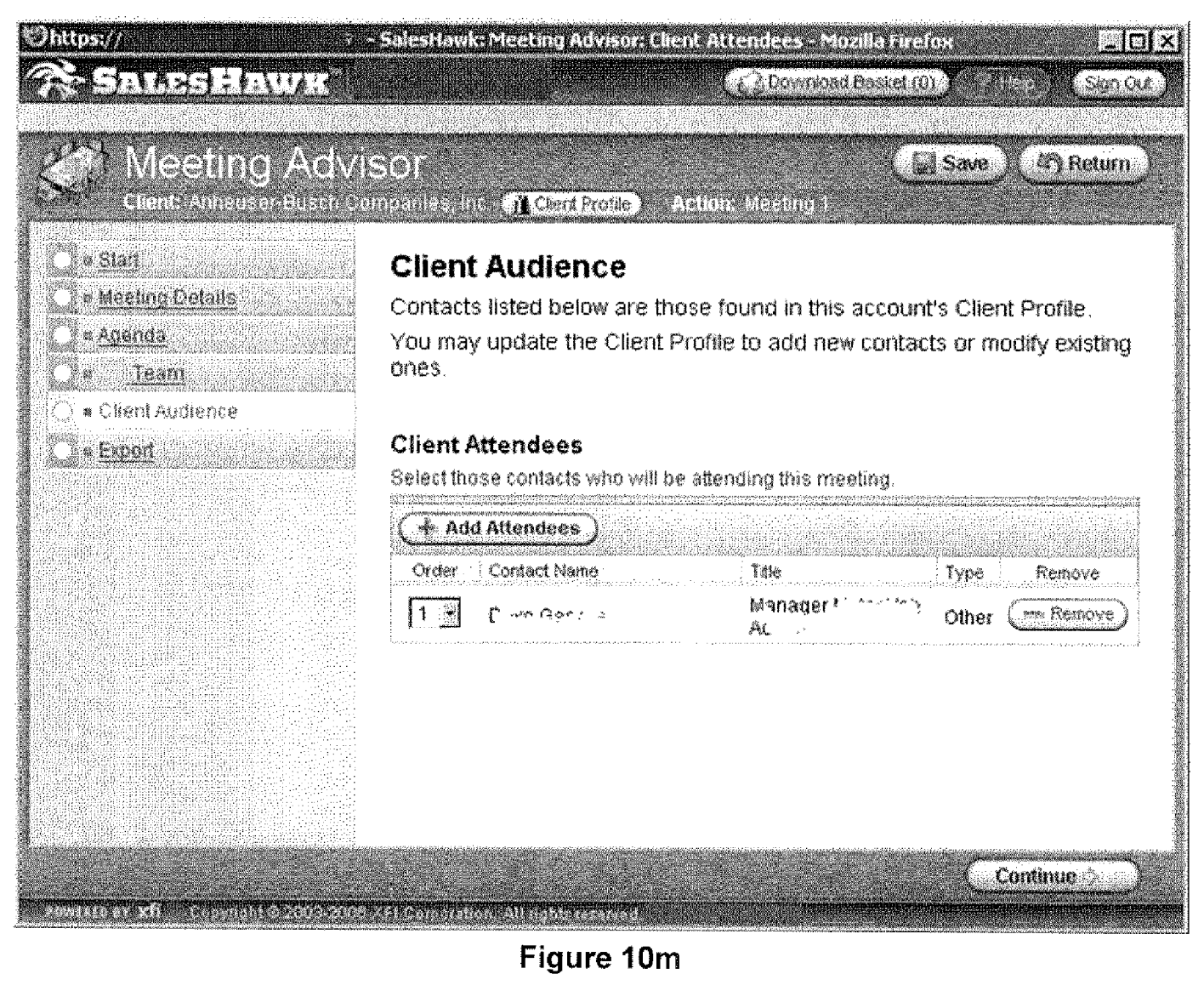
Figure 10N:
Figure 10O:
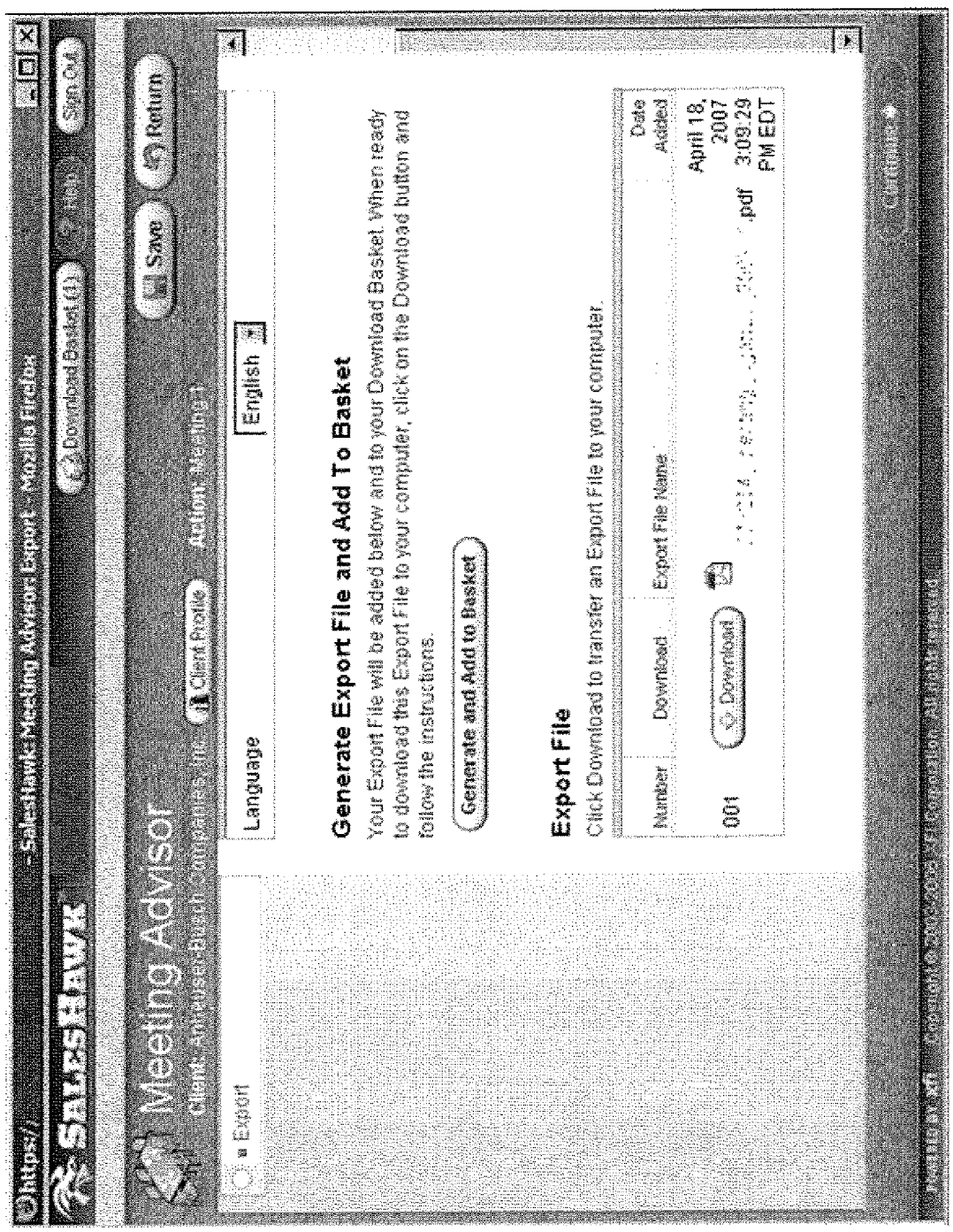
Figure 10P:
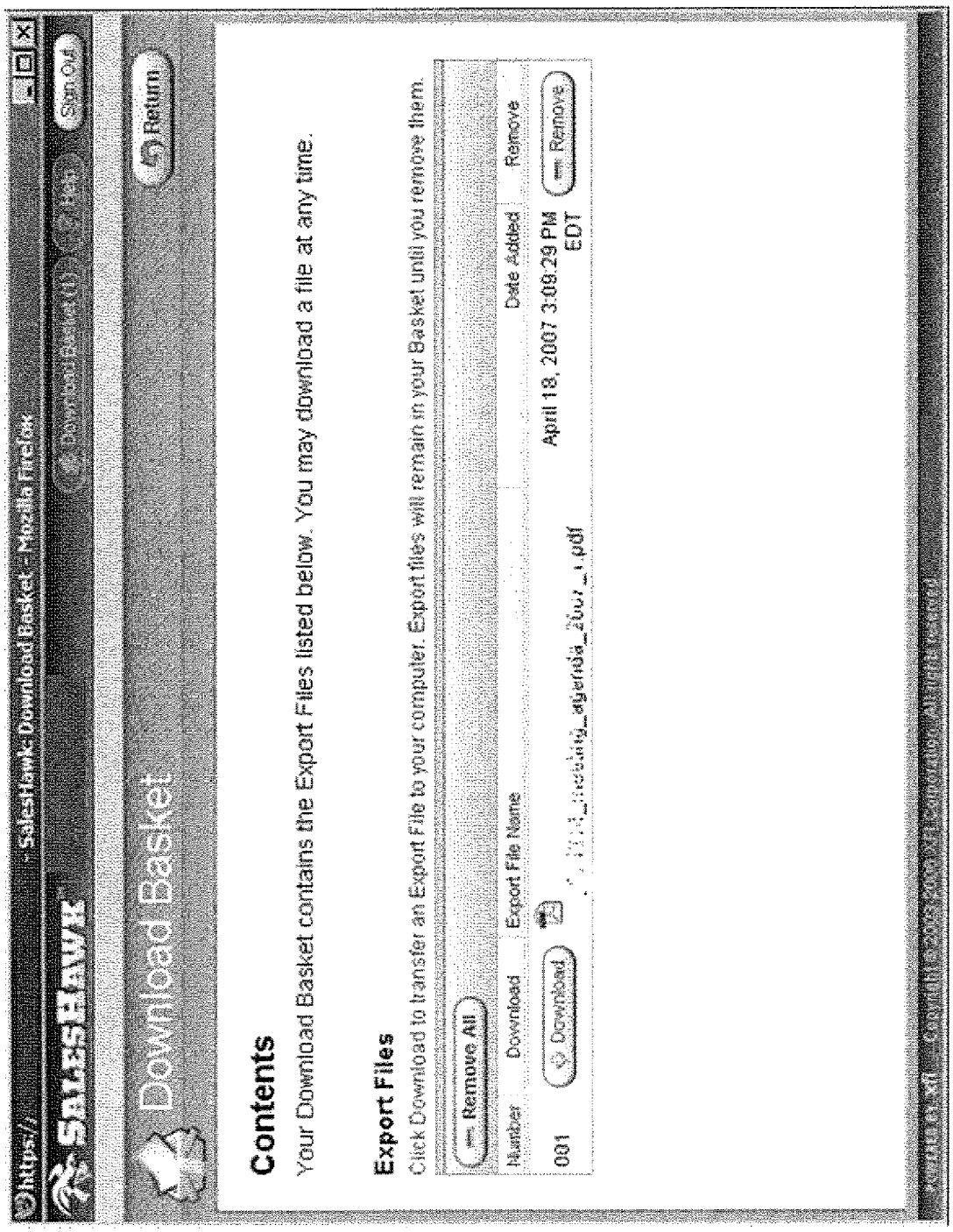

FIG. 10h demonstrates the director advisor has now handed off control of the user interaction to the meeting advisor. FIG. 10i. The meeting advisor steps the user through the scheduling details of the meeting, FIG. 9, including suggesting items for the agenda for the meeting, FIGS. 10j-10l. These suggested agenda items are filtered and sorted by Xference or other artificial intelligence means in light of the best knowledge available to the meeting advisor, for example, based upon client profile information such as company size, industry, and prior sales history or general economic conditions. The meeting advisor then proceeds to assist the user in a straightforward wizard-like manner to add attendees from both the subscriber's and client's organizations, and finally produces a printable PDF document "export" which is added to the user's download basket 10-d and added to the Meeting action in FIG. 10g as the payload artifact of the same meeting action which was previously empty. The meeting action has been serialized to some means of persistent storage and may later be edited by the user or duplicated for use with another client.

This simple use case illustrates the interaction between the director advisor and meeting advisor entities from a user's perspective, and the seamless integration of knowledge into what superficially resembles an ordinary software wizard. The user interface to an intelligent advisor is implemented in simple HTML pages dynamically produced by any number of methods known in the prior art. Access is gained by means of a common web browser and no special skill or training is required for the user to reap the benefits of a continuum of knowledge from simple static data to complex rules-based systems and beyond to include any other means of artificial intelligence which the state of the art offers now or hereafter. These basic principles, illustrated here in the simplest context, are applicable to a plurality of business resource generation problems, for example those addressed by the plurality of business resource generation problems, for example those addressed by the advisors listed in the Figure adapted to the presently preferred sales resource automation embodiment.

Use Case—Analysis Advisor Executive Echelon

In this case, the CEO of the company uses the analysis advisor to view aggregate statistics for all regions, clients and sales personnel by means of a flight report which allows him to zoom in and out of the aggregate statistics to different levels in the corporate hierarchy and optionally produce on or more spreadsheet export artifact of this data.

Figure 3A:
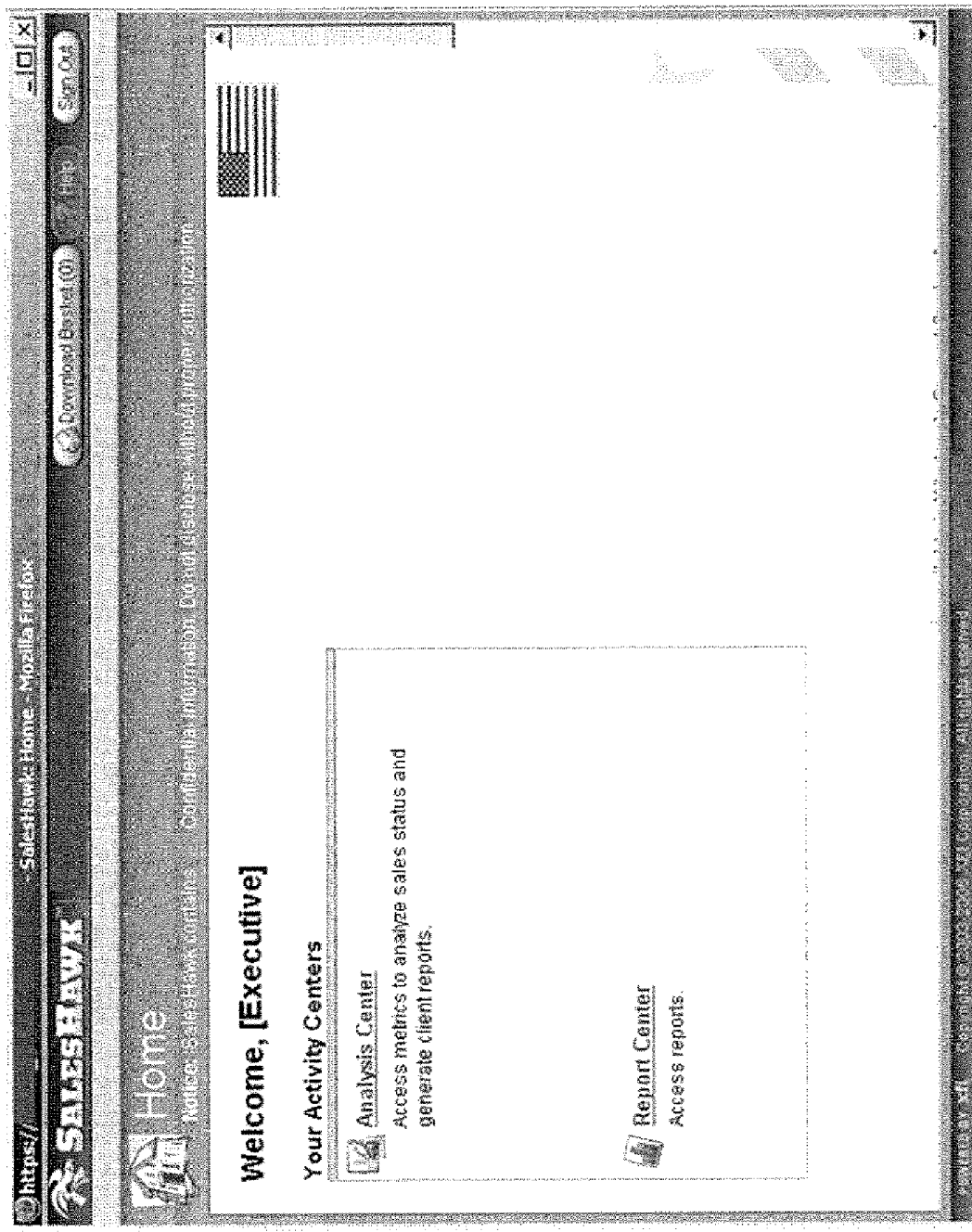
FIGS. 3a-3f are screen captures showing views of a plurality of echelons.
Figure 3B:
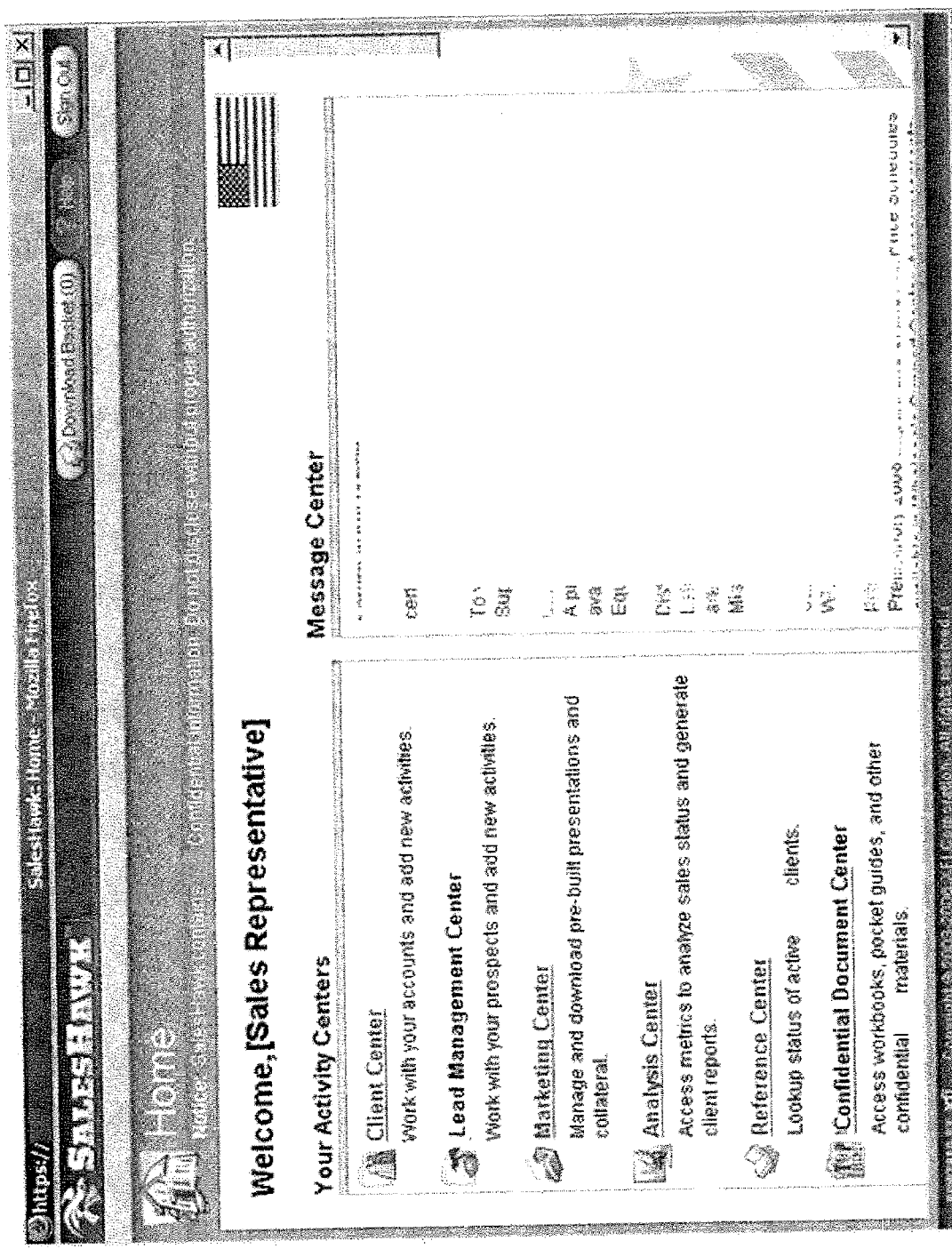
Figure 3C:
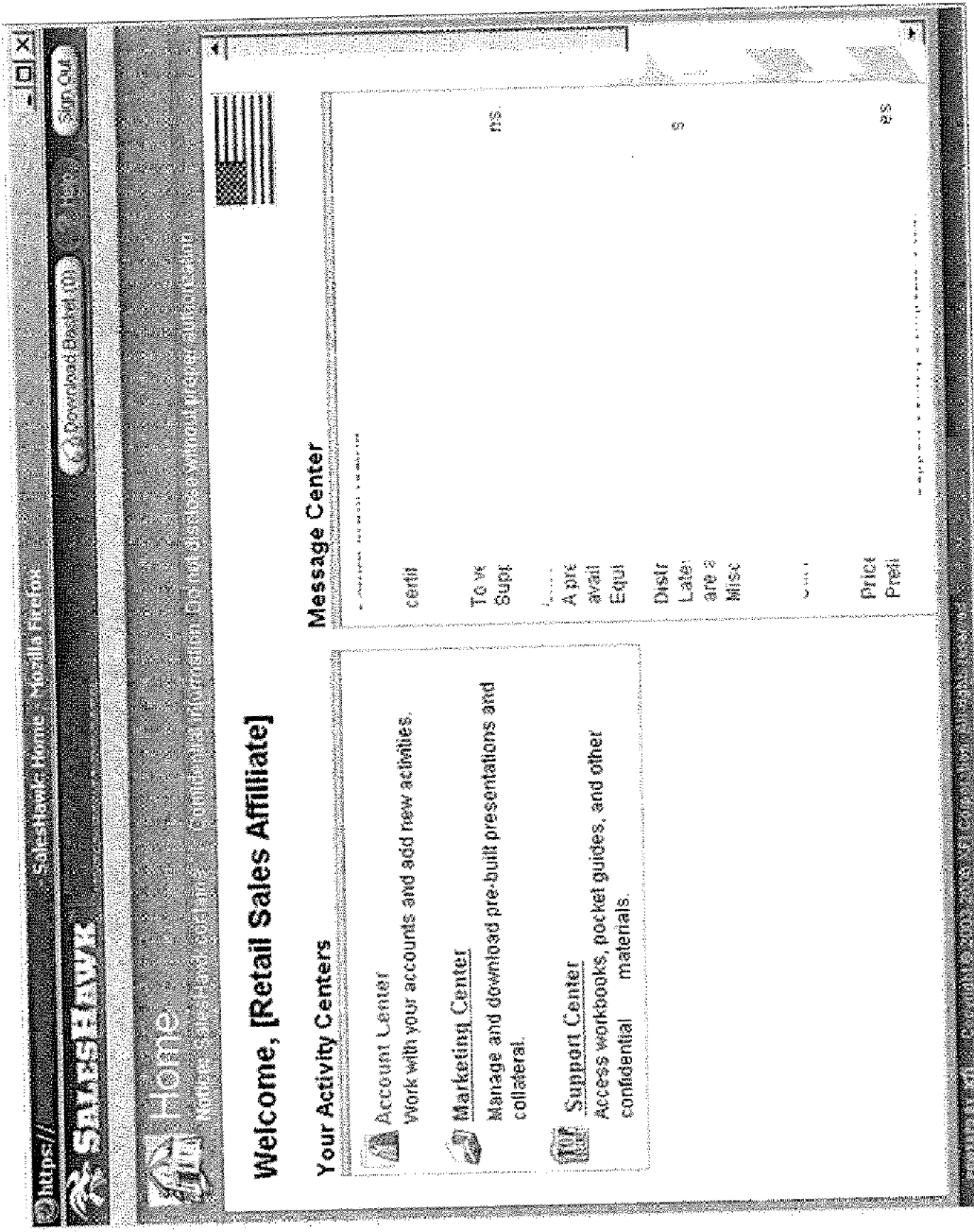
Figure 3D:
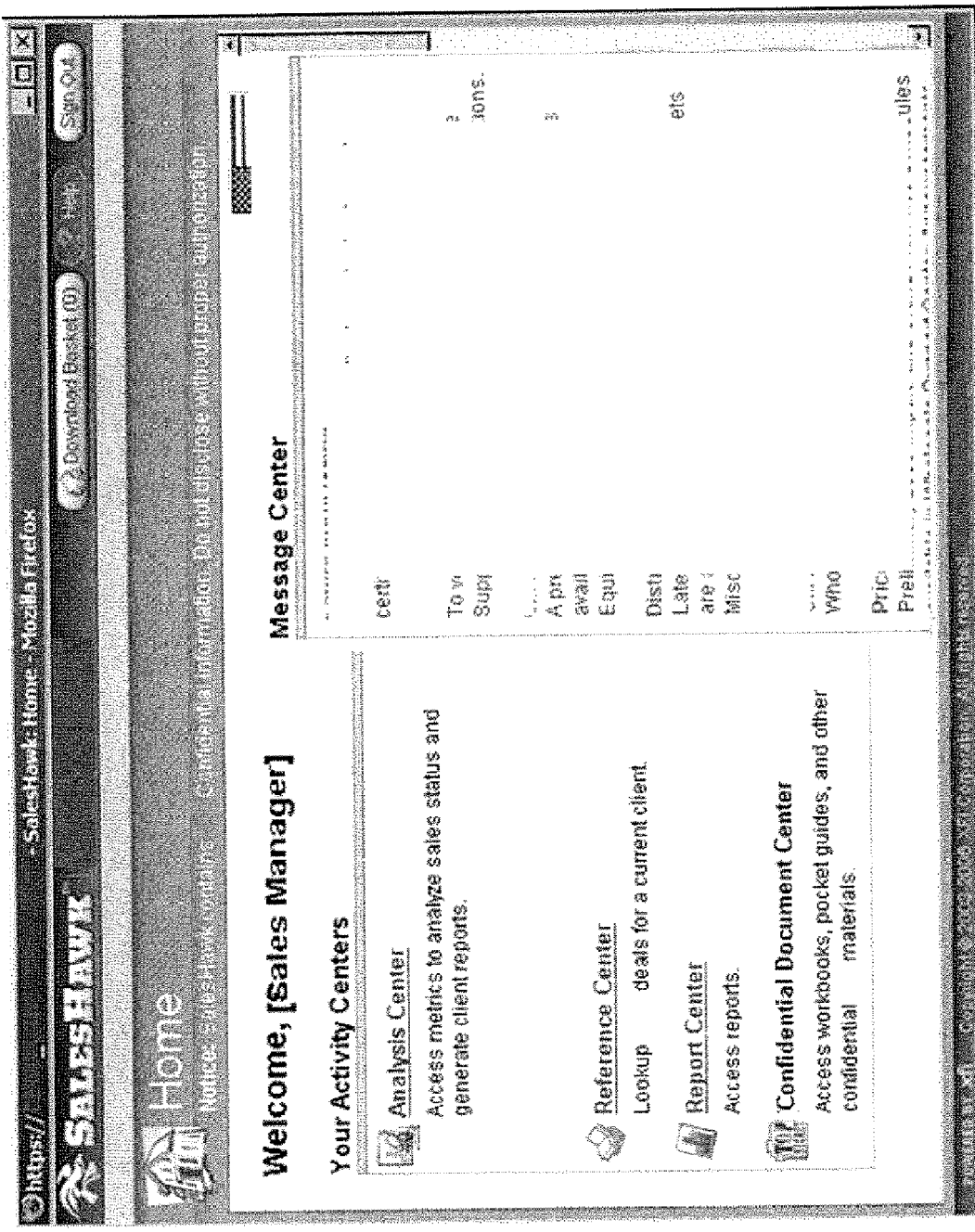
Figure 3E:
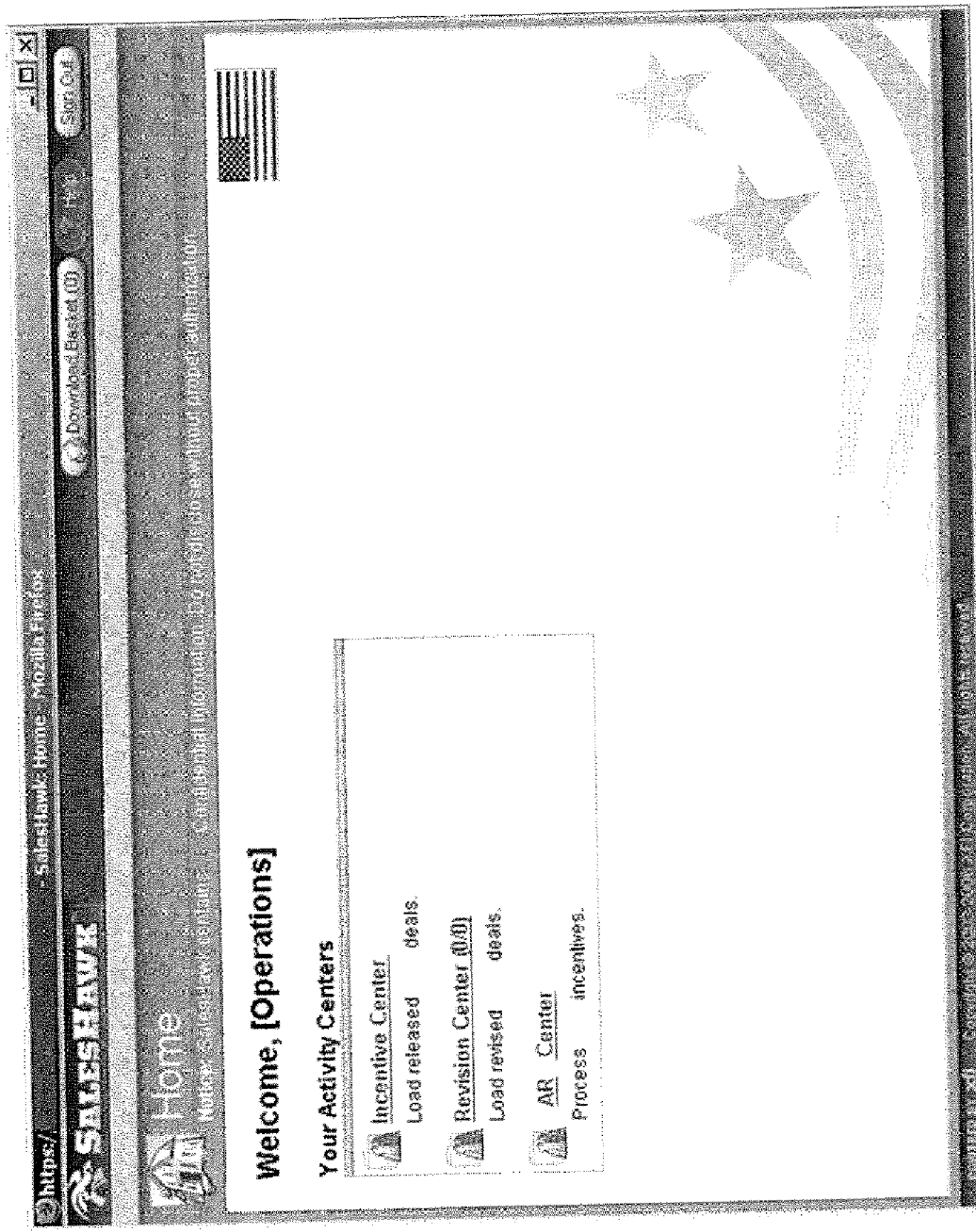
Figure 3F:
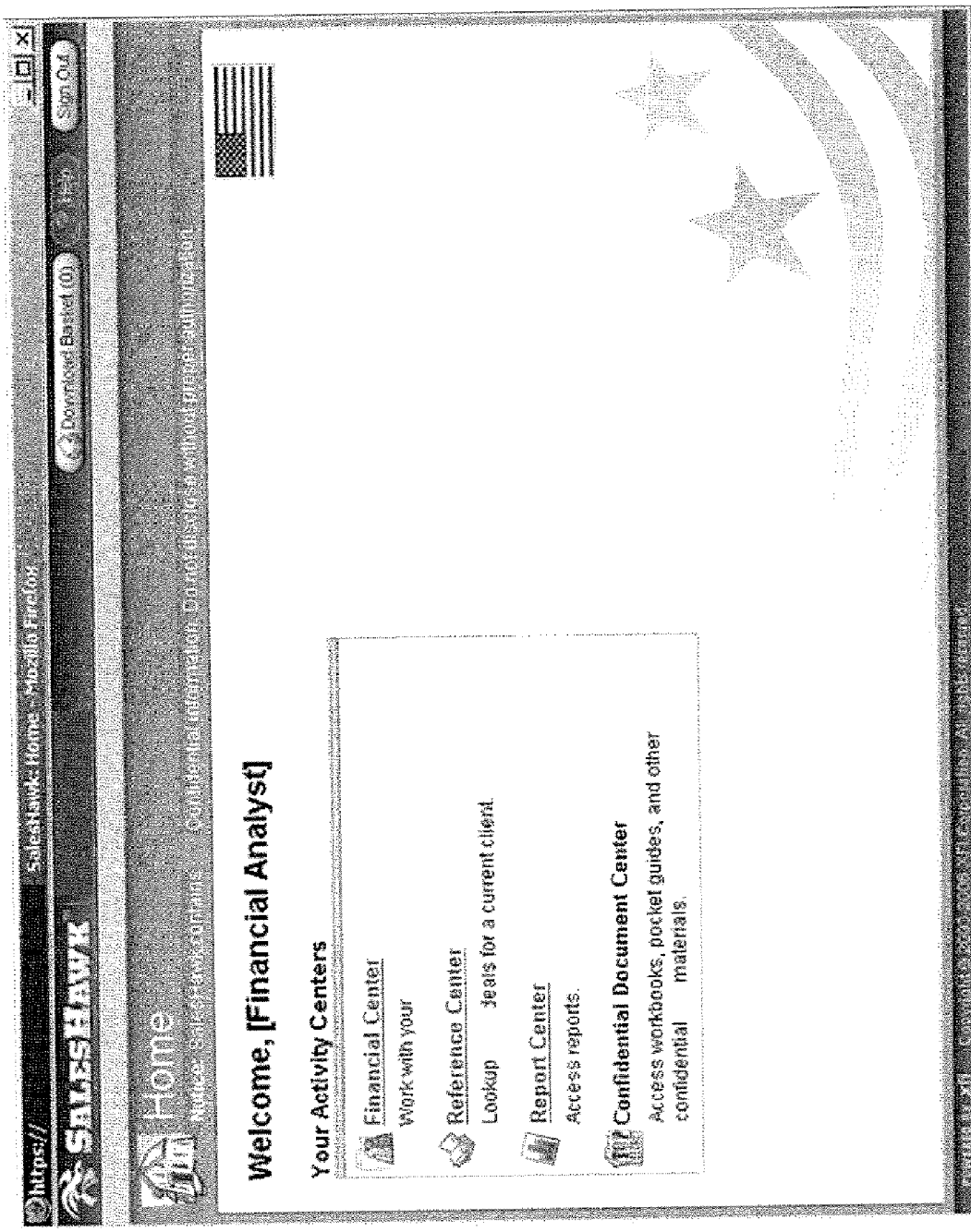

Upon logging in to the SalesHawk application via the launch page, FIG. 1a, the CEO is presented with the executive echelon view in FIG. 3a. Upon clicking the Analysis Center, he is then handed over by the director to the analysis advisor, where he is presented with a top level aggregation of corporate sales efforts and a plurality of reports, including a Sales Flight Report, FIG. 6a. Upon clicking the Sales Flight Report, he is presented with a summary view of Sales Stage Counts for the global sales efforts of the entire organization, starting with the North American Territory FIG. 6b.

To view the average number of days at which sales have been in each defined stage, the user changes the subject to Sales Stage Days. FIG. 6d.

Figure 6A:
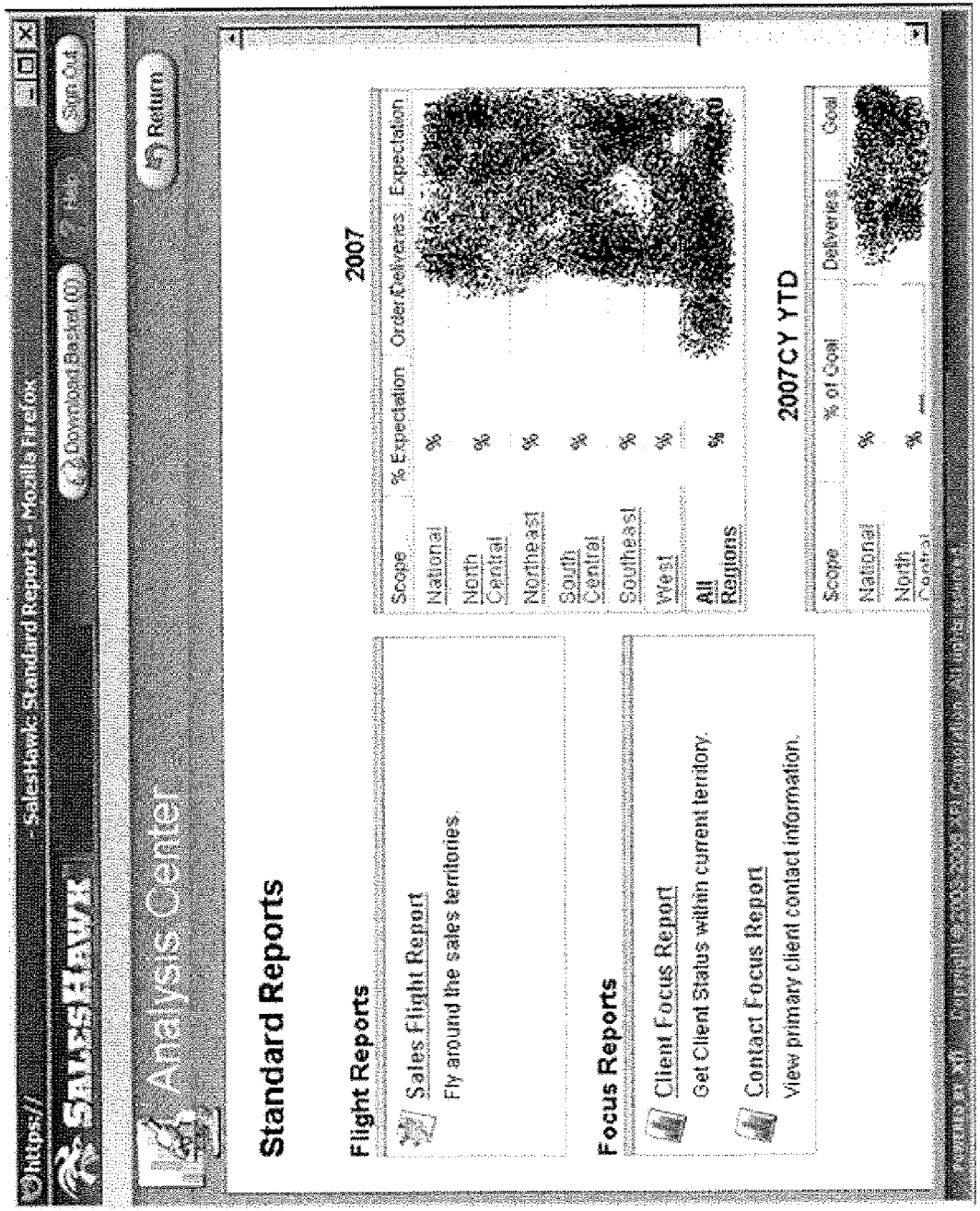
Figure 6B:
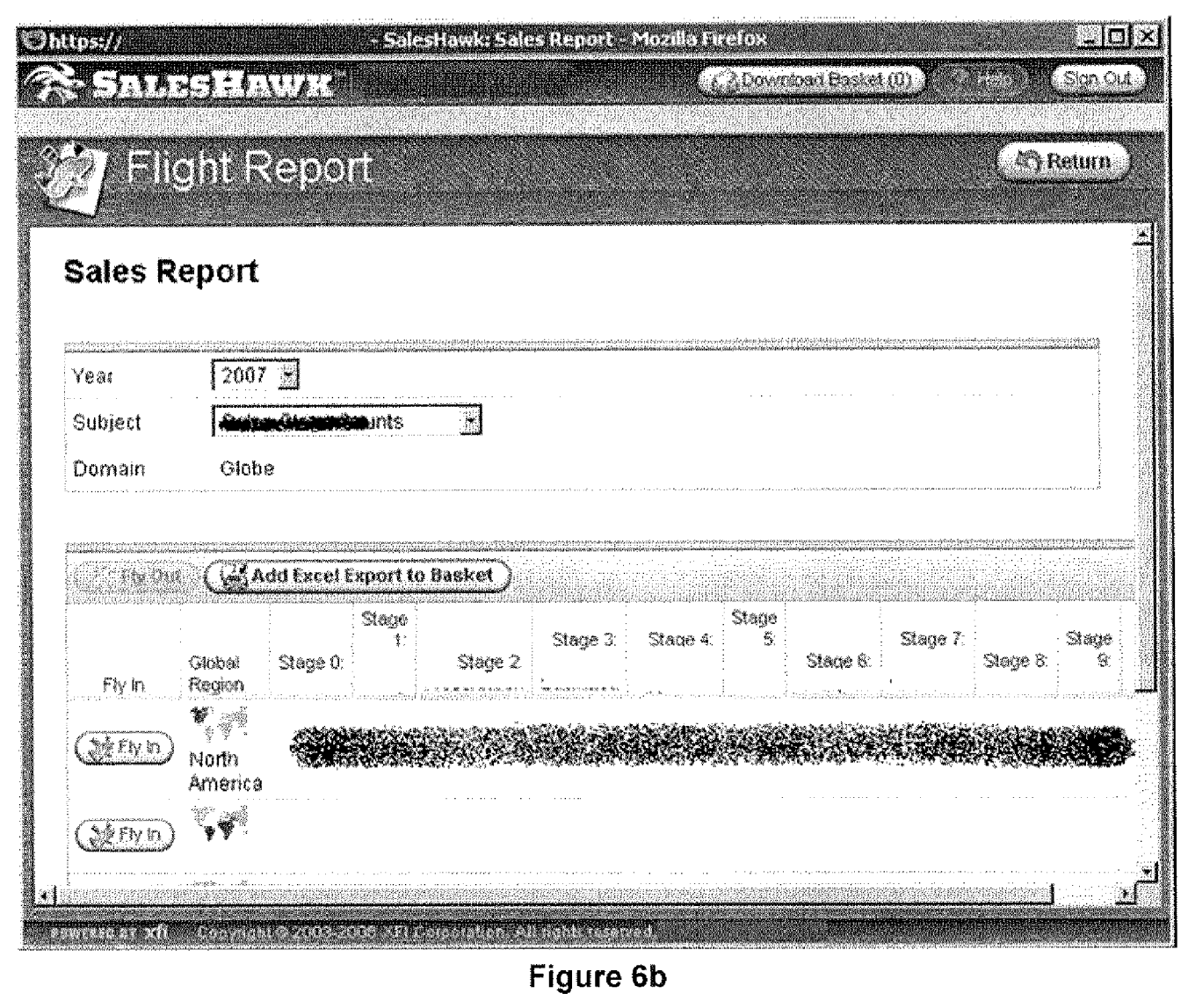
Figure 6C:
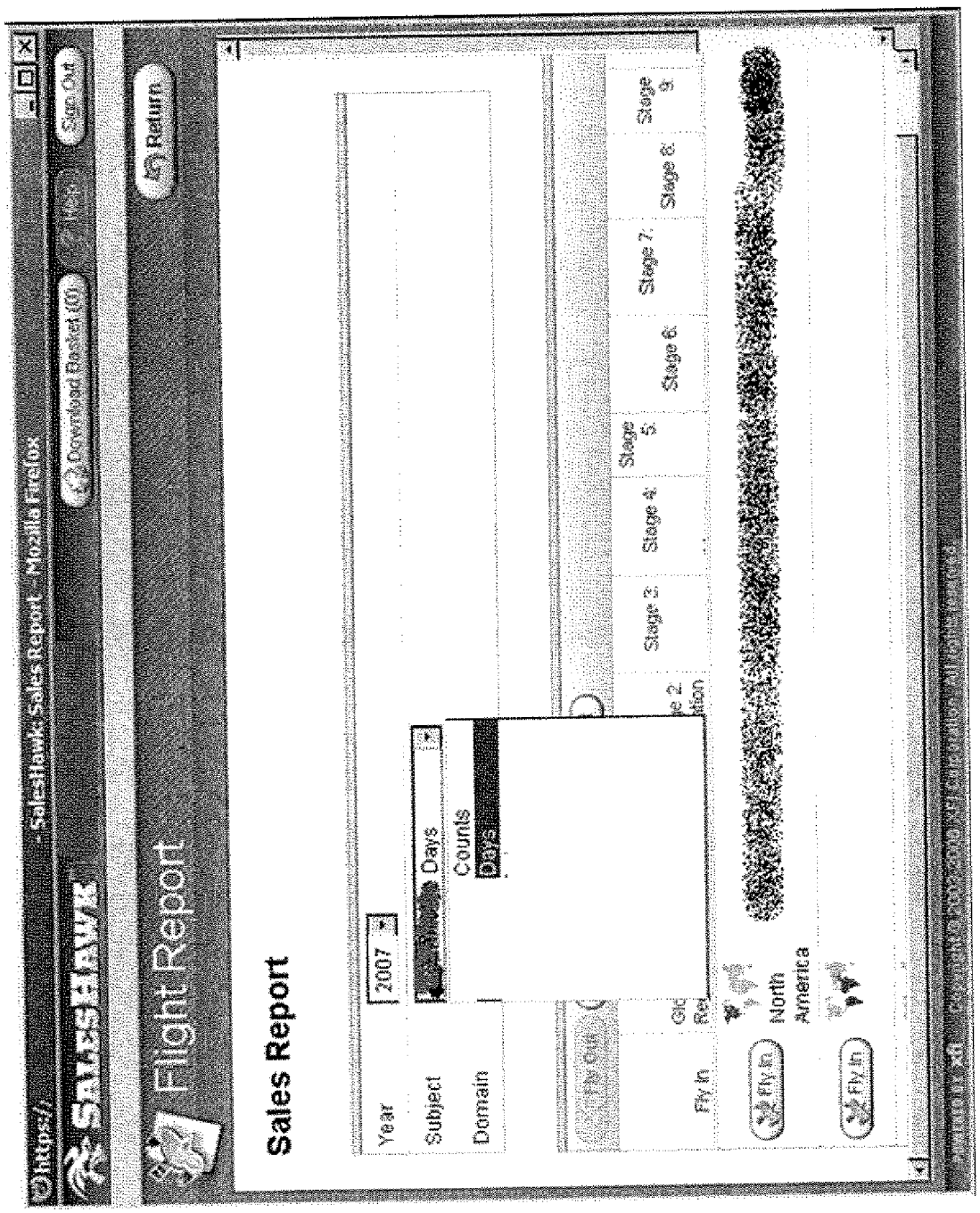
Figure 6D:
Figure 6E:
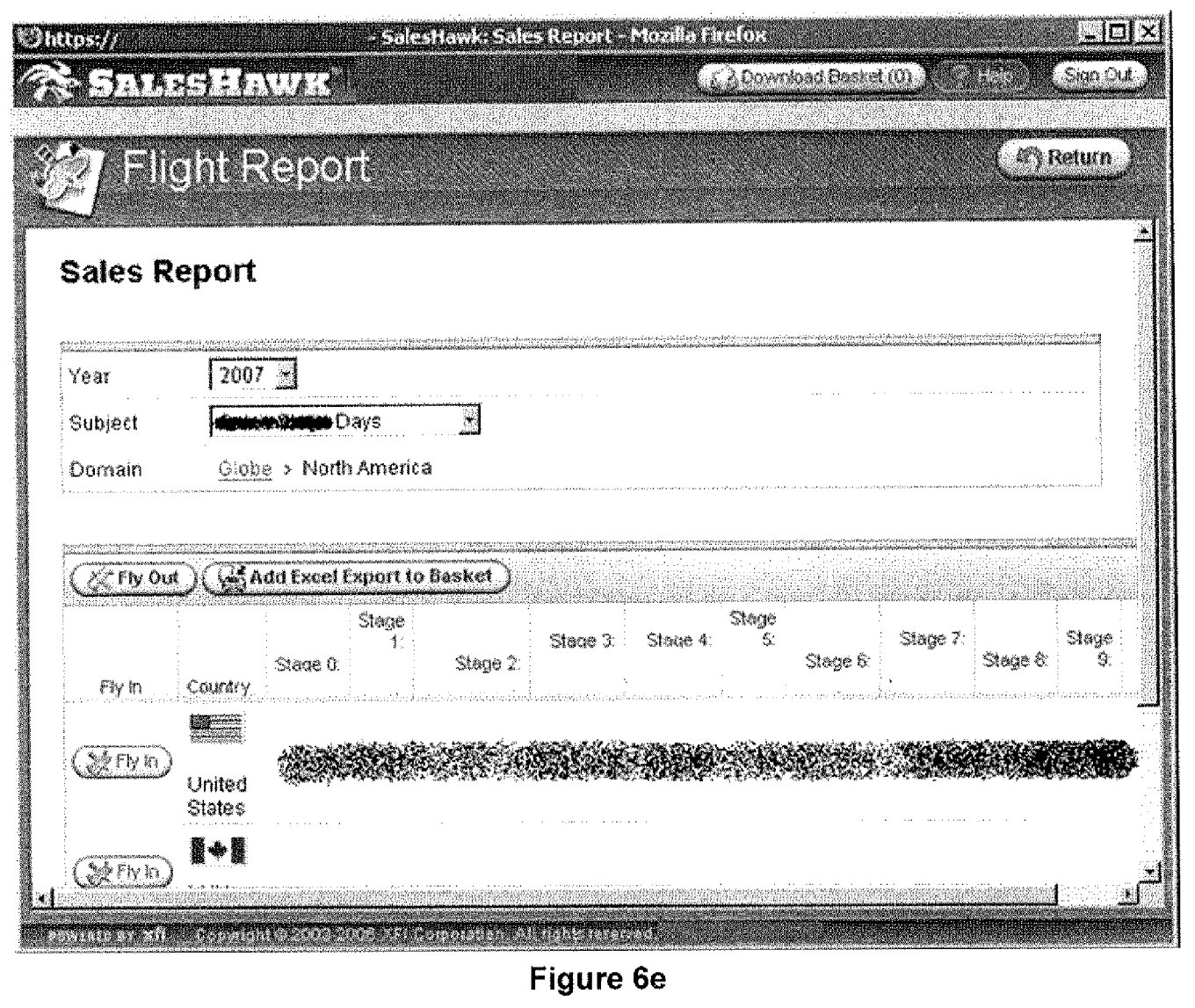

To drill down into the territory, he clicks the Fly In button FIG. 6b to see the same report subject in a more limited territory. FIG. 6c. In this case, the next level of the hierarchy is the three countries of North America, US, Canada and Mexico, each of which can be flown into and summarized to a subscriber-specific level of detail. Further, at any level within this geographical hierarchy, the user can switch the subject, FIG. 6, domain, year or any other of a plurality of subscriber-specific aggregation criteria and instantly compare a complex hierarchy of summary statistics across a plurality of subjects, breadths and depths. The summary currently under examination can be exported to spreadsheet format by means of the export button. FIG. 6a.

This aggregated data is handled by the analysis advisor and may be prepared with the aid of knowledge customized to the needs of the subscriber. It is not limited to data cubes aggregated by means of Online Analytical Processing (OLAP) as in CRM systems or other existing enterprise software.

This use case illustrates not only a novel mode of generating and viewing aggregated statistical data, but also one of a plurality of advisor-action types. The action taken by the analysis advisor in this context consists of the presentation of the data in dynamic form and does not serialize to disk as a persistent payload-carrying action object like a meeting action. Although the export functionality allows a snapshot of the data to be serialized to disk as a spreadsheet, this spreadsheet exists outside of the advisor-action architecture.

Use Case—Analysis Advisor—Wholesale Sales Representative Echelon

In this case a sales representative uses the analysis advisor to view statistics relevant to his own sales efforts. In this case however, the same analysis advisor has been invoked in a different echelon from that of the CEO and presents the sales rep user with view of the corporate sales statistics limited to those to his own clients. This is accomplished the same analysis advisor acting upon a template adapted to the present echelon.

Figure 11A:
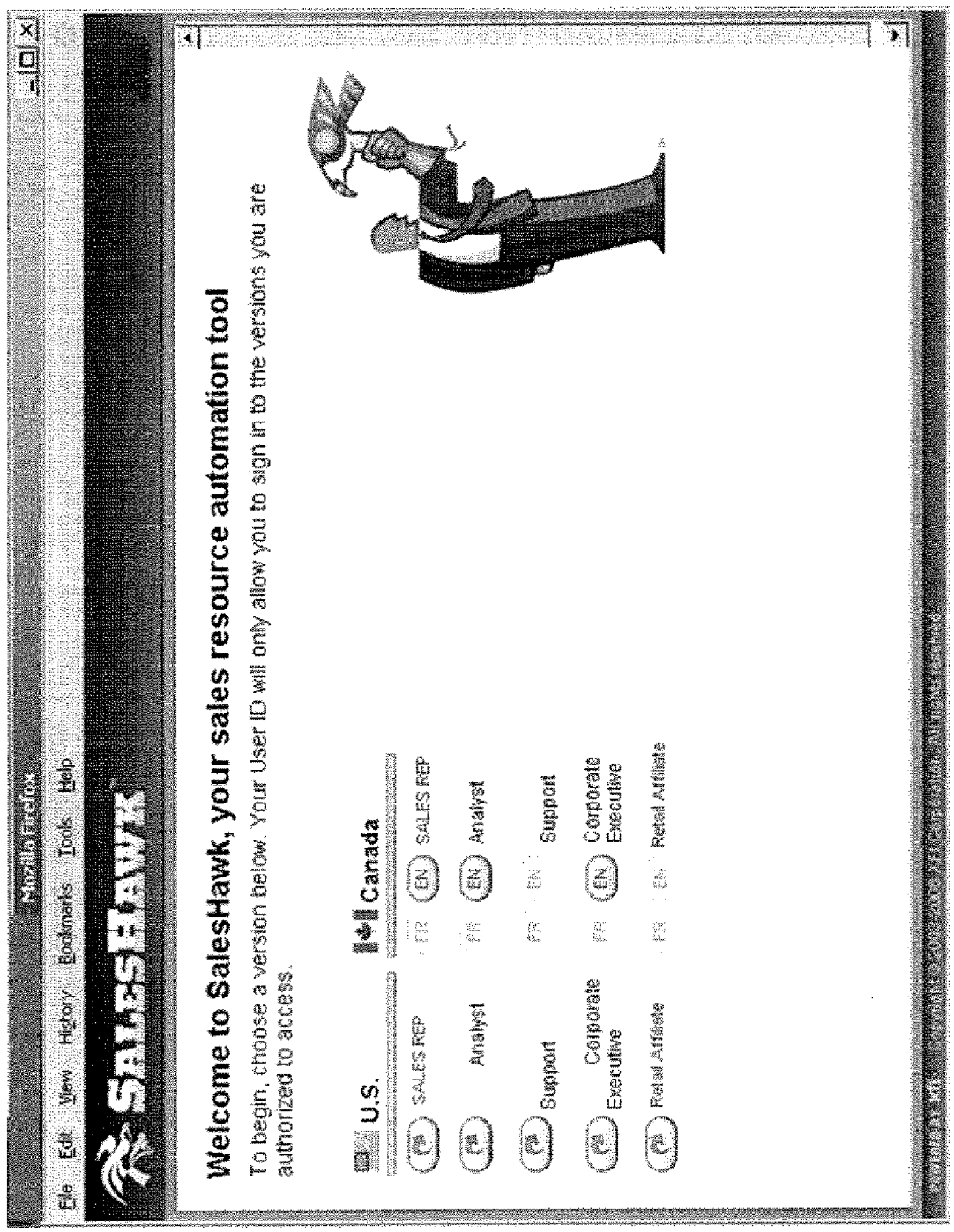
FIGS. 11a-11b are a series of screen captures showing the http launch and https login pages.
Figure 11B:
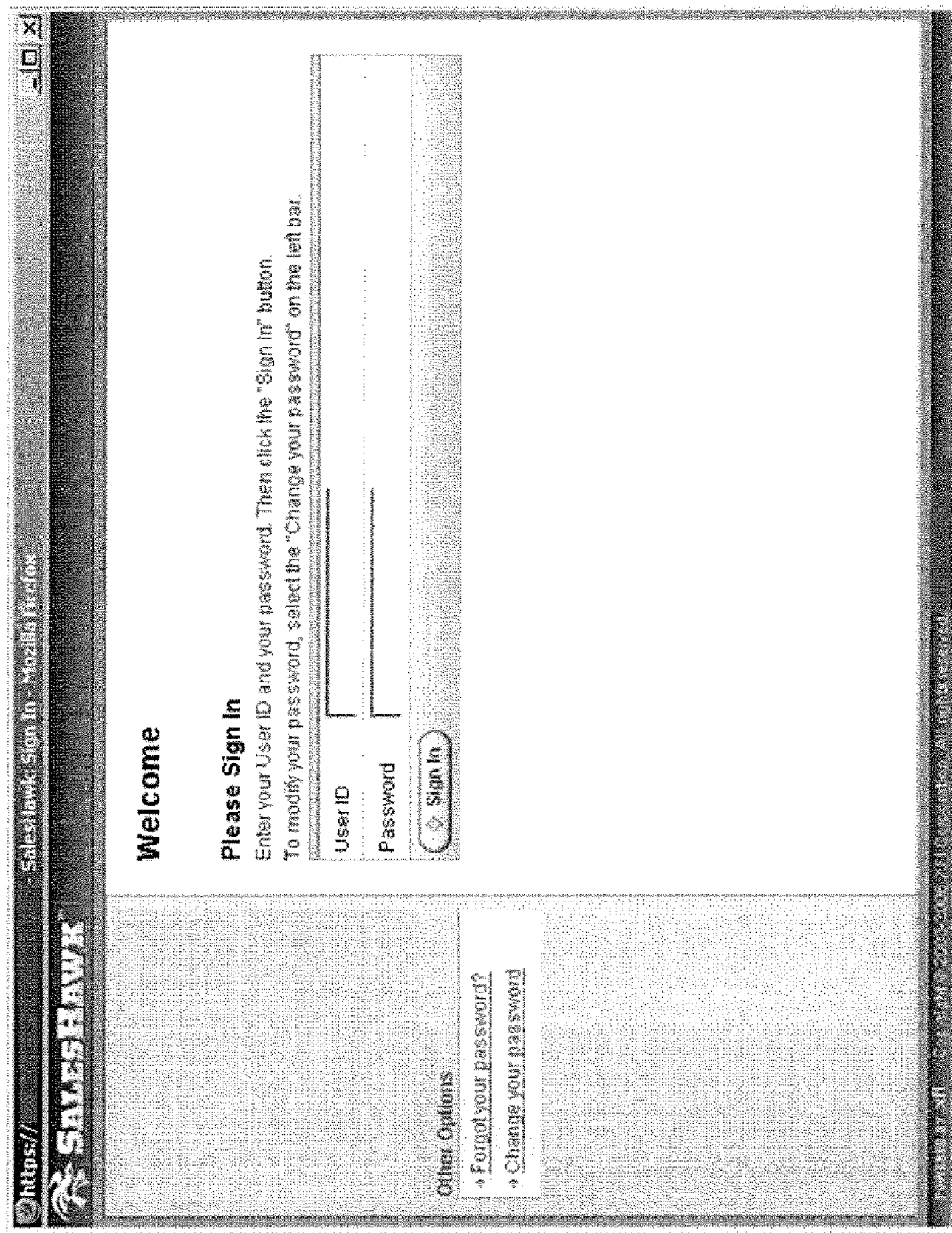
Figure 12:
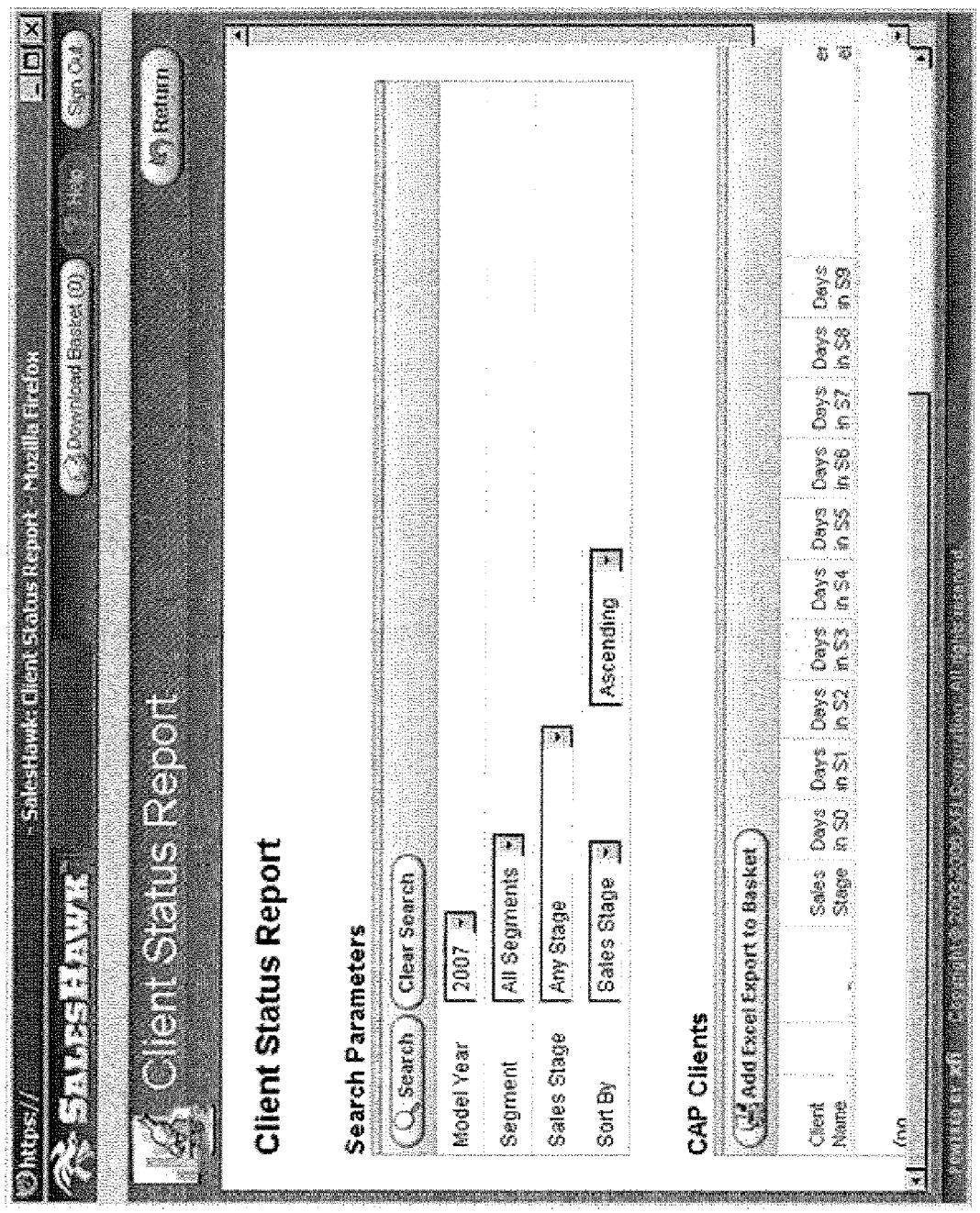
FIG. 12 is a screen capture showing a report created by the analysis advisor in the context of the sale representative echelon.

Upon logging in to the SalesHawk application via the launch page, FIG. 11, the sales rep is presented with the echelon view in FIG. 3b. Upon clicking the Analysis Center control of his session is then handed over by the director to the analysis advisor in FIG. 12, where the user is presented with a single report type limited to the status of his own sales efforts.

The analysis advisor limits the data visible in this echelon by means of a template customized to subscribers' requirements for sales representatives.

Although other modifications and changes may be suggested by those skilled in the art, it is the intention of the inventors to embody within the patent warranted hereon all changes and modifications as reasonably and properly come within the scope of their contribution to the art.

I claim:

1. A method of providing hosted business resource automation within a logical framework, comprising:
   hosting a business resource automation system for a company;
   structuring said business resource automation system as a hierarchical structure, said hierarchical structure including a solution level, a subscriber level, a plurality of levels thereunder corresponding to a subscriber's business processes, said levels being styled as at least one of channels and silos;
   terminating the hierarchical structure in an echelon, said echelon corresponding to a role of a user within a subscriber enterprise with a unique set of input, output and information access requirements; and
   receiving a request for at least one business document from a user;
   determining at least one echelon of the user within the hierarchical structure;
   in response to a user request, automatically generating a business document as a business resource using the hosted business resource automation system, said business document being dependent on an echelon of the requesting user so as to match the level of information in the document with the level of the user in the company.

2. A method as claimed in claim 1, further comprising the step of:
   generating a logical advisor entity, said logical advisor entity receiving information of an echelon of a requesting user, said logical advisor entity takes actions within an echelon corresponding to the user upon request of the user, said actions resulting in one of initiation of a business process and creation of a business artifact, said at least one of said business process and said business artifact including a business document corresponding to an echelon of the user.

3. A method as claimed in claim 2, wherein said step of terminating terminates the hierarchical business structure in a plurality of echelons, and further comprising the step of:
   generating a plurality of logical advisor entities; a same one of said logical advisor entities existing within different ones of said echelons and a same action acts upon a one of a plurality of templates adapted to requirements of a single sibling echelon.

4. A method as claimed in claim 1, further comprising the steps of:
   storing information relating to a business on a computer readable storage media, said information including non-tabular information, said information including information on clients or customers of the business;
   generating a plurality of logical advisor entities in physical memory of the business resource system, each of said logical advisor entities being operable to perform at least one action in a plurality of said echelons;
   performing an action by at least one of said logical advisor entities in response to a user input, said logical advisor entity accessing the business information stored on the computer readable media while performing the action, the action by the logical advisor entity including said step of automatically generating the business document.

5. A method as claimed in claim 4, wherein said business document is at least one of an electronic document, a paper document or an electronic entry in a program.

6. A method as claimed in claim 4, wherein said information stored on said computer readable media includes at least one of prior input of a user to the logical entity, relational database tables, databases, flat text files, images files and audio visual files.

7. A method as claimed in claim 4, wherein said business document generated in the method includes at least one of an email, a voice mail, a facsimile document, a text document, a spreadsheet, a graphical slide presentation, and an entry of a scheduled event.

8. A method as claimed in claim 4, wherein plural advisor entities are generated each with different respective functions and said plural advisor entities communicate with one another in performing the action.

9. A method as claimed in claim 8, further comprising the step of:

generating a director advisor entity that handles communications between advisor entities.

10. A method as claimed in claim 8, further comprising the step of:

generating an interface for each logical advisor entity through which the logical advisor entities communicate with one another.

* * * * *